United States Patent
DeFillipi et al.

(10) Patent No.: US 7,514,029 B2
(45) Date of Patent: Apr. 7, 2009

(54) METHOD FOR FORMING SEALING DEVICES ON FASTENERS

(75) Inventors: James DeFillipi, Leonard, MI (US); Gerald Snow, Almont, MI (US)

(73) Assignee: ND Industries, Inc., Clawson, MI (US)

( * ) Notice: Subject to any disclaimer, the term of this patent is extended or adjusted under 35 U.S.C. 154(b) by 381 days.

(21) Appl. No.: 11/351,082

(22) Filed: Feb. 9, 2006

(65) Prior Publication Data
US 2006/0130291 A1 Jun. 22, 2006

Related U.S. Application Data

(60) Division of application No. 10/637,612, filed on Aug. 11, 2003, now Pat. No. 7,118,363, which is a continuation of application No. PCT/US03/20980, filed on Jul. 7, 2003.

(60) Provisional application No. 60/393,601, filed on Jul. 5, 2002.

(51) Int. Cl.
*B29C 39/04* (2006.01)
*B29C 39/10* (2006.01)
(52) U.S. Cl. .................. 264/275; 264/259; 264/297.7
(58) Field of Classification Search ............ 264/259, 264/275, 297.7
See application file for complete search history.

(56) References Cited

U.S. PATENT DOCUMENTS

| 3,009,197 | A | 11/1961 | Hahn |
| 3,824,062 | A | 7/1974 | Farrell |
| 4,268,942 | A | 5/1981 | Meal et al. |
| 4,383,964 | A | 5/1983 | Prus |
| 5,005,242 | A | 4/1991 | Kennedy et al. |
| 5,053,173 | A | 10/1991 | Sticht |
| 5,647,713 | A | 7/1997 | Ge et al. |
| 5,987,714 | A | 11/1999 | Smith |
| 2002/0069492 | A1 | 6/2002 | Smith |

FOREIGN PATENT DOCUMENTS

CH 569402 A 11/1975

*Primary Examiner*—Robert B Davis
(74) *Attorney, Agent, or Firm*—Winston & Strawn LLP; Richard P. Gilly

(57) ABSTRACT

A method and apparatus for forming sealing and/or retaining elements on a wide variety of fastening devices is provided. The fasteners are conveyed on fastener nests each having a chamber, a fastener lock and a fastener release that are moveable relative to each other. The fasteners then have material applied to them which is cured while the fasteners are in the nests on the conveyor. The fasteners with the sealing and/or retaining element formed thereon are then removed therefrom. A novel fixture for holding fasteners to be processed and an element sealing device having a fastener with a resilient sealing element adhered to a portion thereof with a depression formed therein in close proximity to a portion of the fastener is also provided.

18 Claims, 22 Drawing Sheets

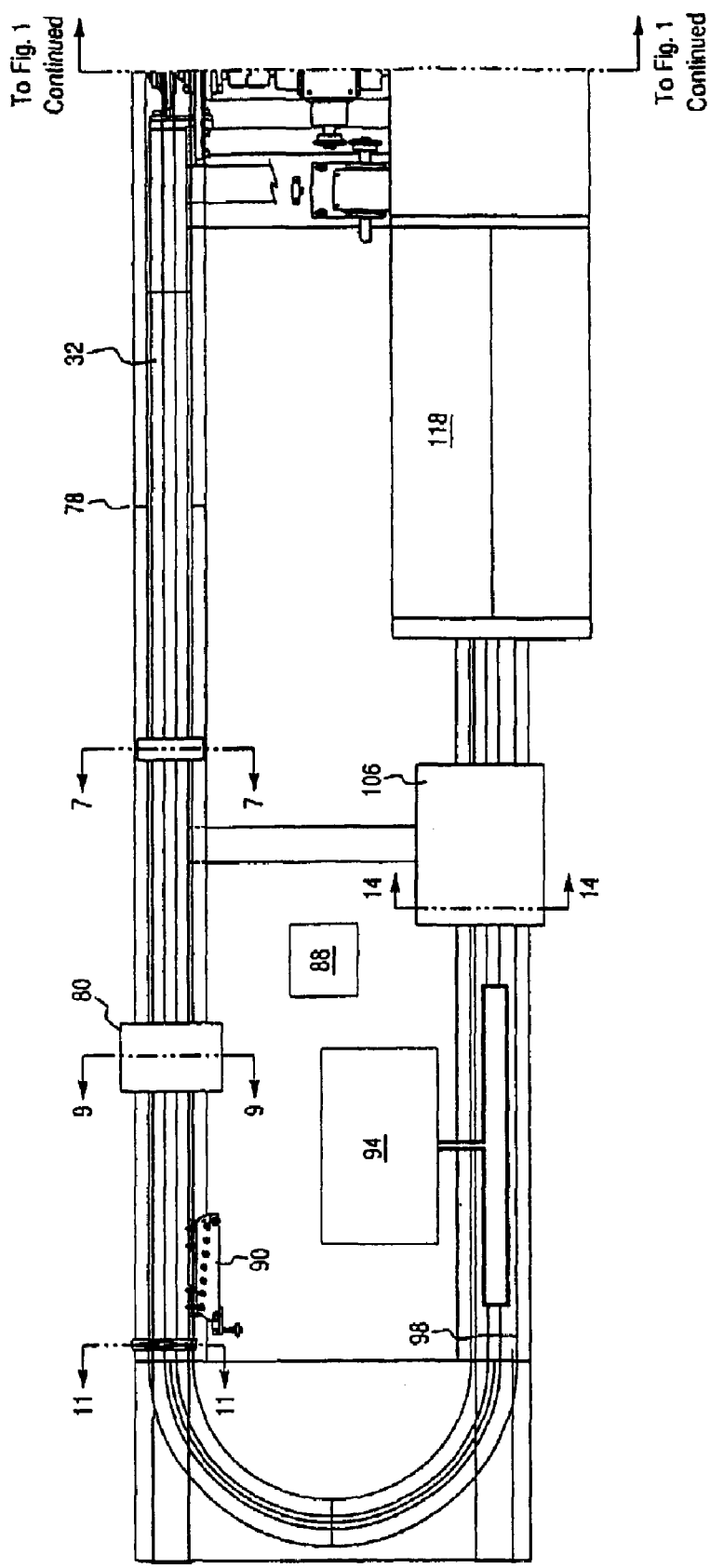

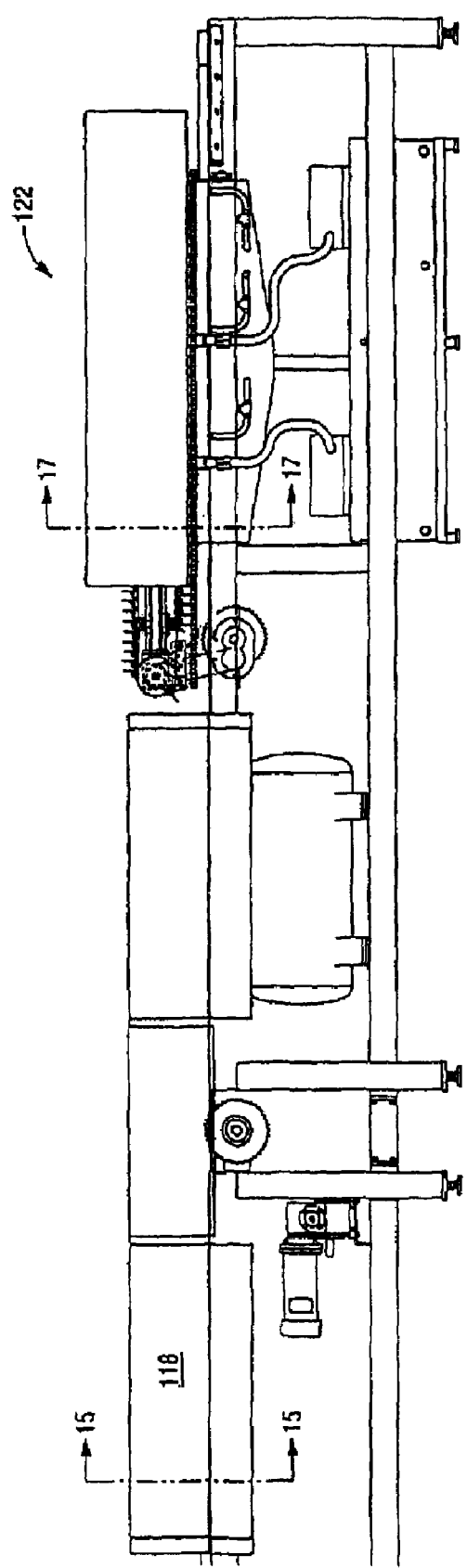

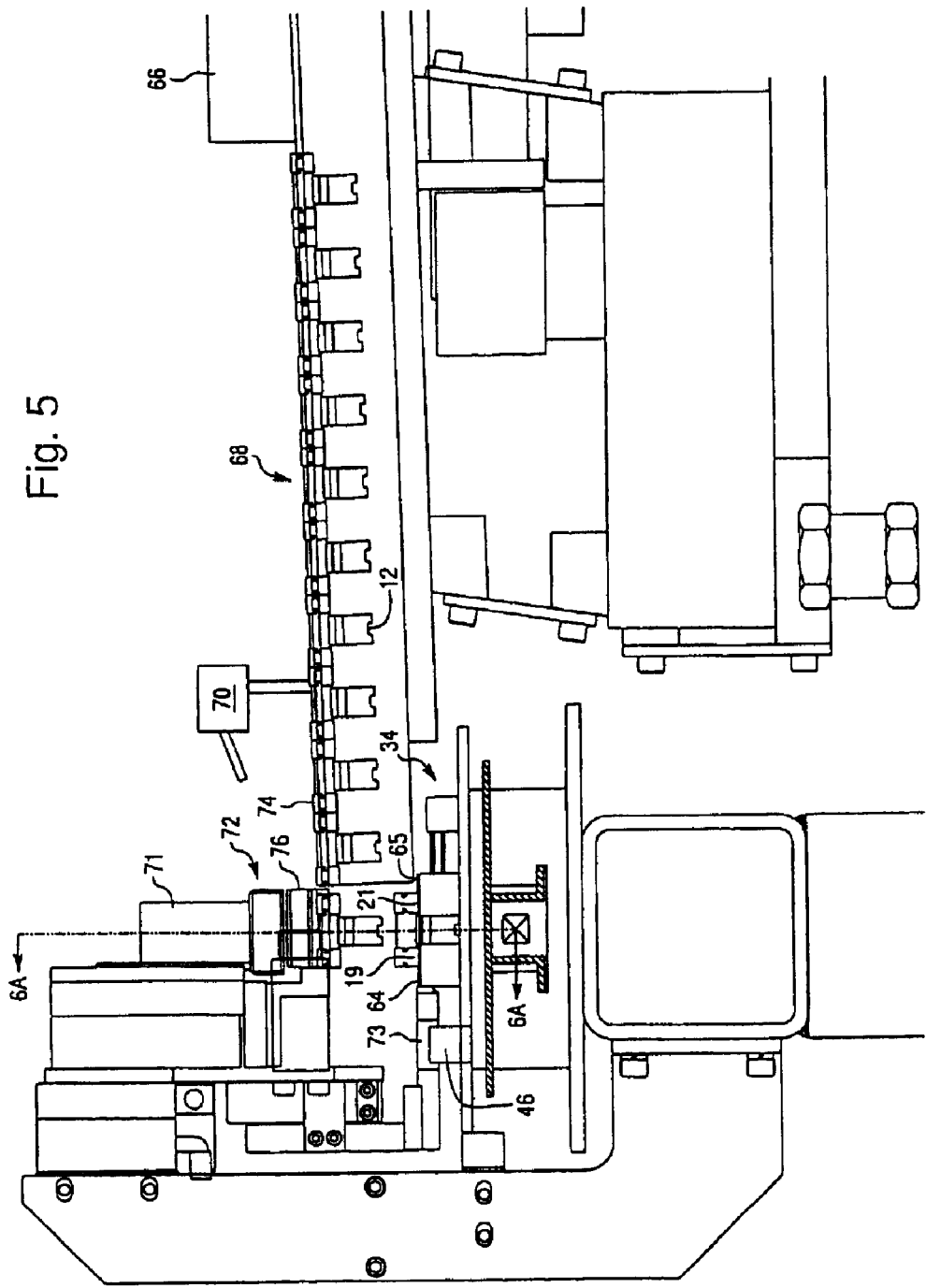

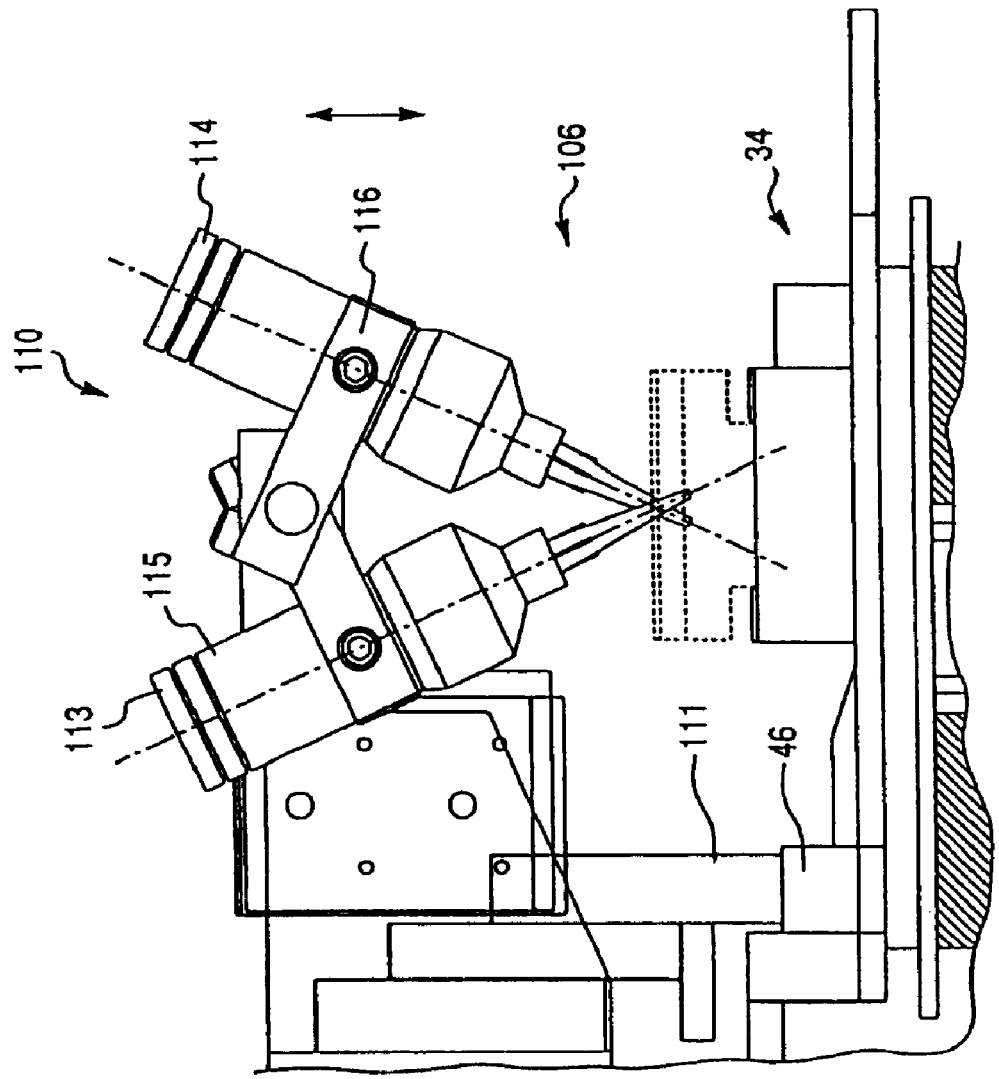

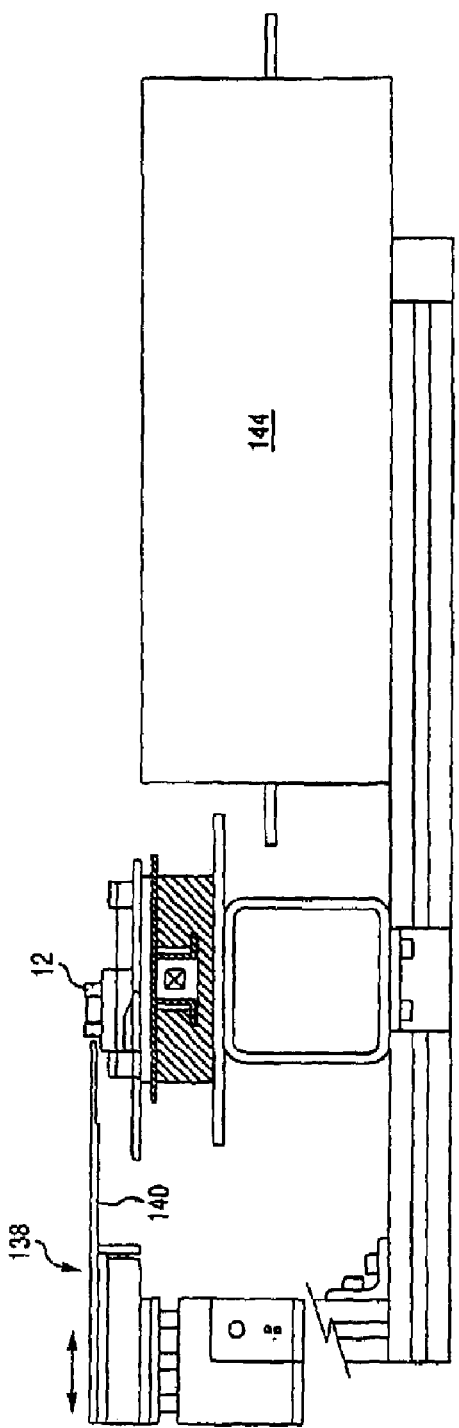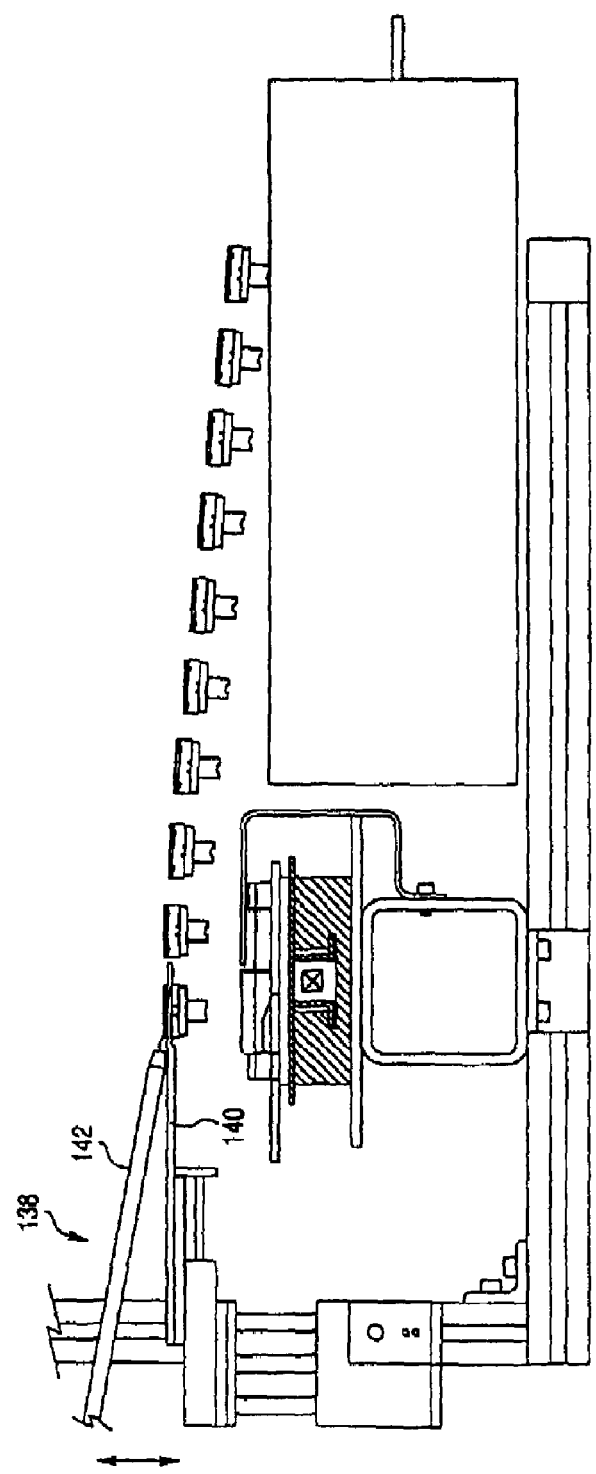
Fig. 20
Fig. 21

METHOD FOR FORMING SEALING DEVICES ON FASTENERS

CROSS-REFERENCE TO RELATED APPLICATION(S)

The present application is a divisional of U.S. Ser. No. 10/637,612, filed Aug. 11, 2003, now U.S. Pat. 7,118,363, which is a continuation of PCT Application No.: PCT/US2003/020980, filed Jul. 7, 2003, which claims the benefit of U.S. Provisional Application No. 60/393,601, filed Jul. 5, 2002.

BACKGROUND OF THE INVENTION

1. Field of the Invention

The present invention relates to a method and apparatus for forming sealing elements on a variety of fastening devices and novel sealing and retaining devices resulting therefrom. More particularly, the present invention relates to an automated method and apparatus for forming a compressible sealing element on and extending from a metal fastener such as a clip, that prohibits air and moisture transfer between the top and bottom portions of the clip, and yet allows both portions of the clip to remain flexible for easy installation into a finished assembly. The present invention further relates to a method and apparatus for forming a sealing element on a fastening device, such as a metal clip, wherein the sealing element contains a region that permits installation thereof into a finished article with low installation force.

2. Description of the Related Art

Fastening devices such as metal retaining clips are extensively used in various articles of manufacture. Such devices have for many years, provided a reliable, efficient and cost effective way of grasping and retaining one material and joining it to a separate substrate. An example of a metal clip that is prevalently used in the automobile industry is a T-shaped clip that has a central clip on its lower portion for anchoring it to a substrate, and two smaller spaced clips at the outer edges of the upper portion thereof for receiving and retaining material and thereby joining it to the substrate. One of the many uses of such metal retaining clips is joining trim to the interior of a vehicle door frame. In this example, the lower central clip engages the door frame and the upper spaced clips engage and anchor the door trim to the clip, and thereby the frame.

One of the drawbacks associated with use of metal clips of the type described above, is that they are often installed in places where they will encounter water or moisture. Due to the irregular shape of the clips, once they are installed they leave voids where moisture can transfer from the upper portion of the clip to the lower portion of the clip and the hole that it is pressed into. Such occurrences can lead to a collection of liquid or moisture in the hole and/or further negative effects that can result from a door frame or other parts being exposed to moisture or liquids over an extended period of time. In addition to these problems, the clips do not lessen sound transmission between the lower portion of the clip and the upper portion, and are also susceptible to rattling or loosening as a result of vibration or impact. All of these occurrences obviously present undesirable drawbacks in an automobile or other article of manufacture that utilize such clips.

In order to overcome these drawbacks, several solutions have been proposed. However, none of the solutions has had the attributes of being sufficiently reliable and economical. A number of solutions have involved the application of a sealing device on a clip between the top and bottom portions thereof, in order to allow a receiving hole that the clip is pressed into to be sealed in a water-tight manner. These known solutions for adding a sealing element to metal retaining clips, however, have all presented some rather significant problems. To begin with, such sealing devices have required a preformed element to be first manually installed on the clip. The process of manual installation has been slow, costly and lends itself to installation problems, such as alignment difficulties. In addition, manual installation of such elements requires a relatively precise tolerance that frequently is not present, in order to have the sealing device be close enough to the clip so that it will be retained and yet loose enough to permit initial installation. Most all of the manually installed sealing elements of the prior art have required a subsequent heating or baking step in order to adhere them and form a water tight seal on the clip.

The difficulties encountered in attempting to properly manually install such sealing elements on the clips were frequently compounded when the entire assembly was subjected to heating. The end result was often uneven or incomplete adherence of the device to the clip surface insufficient to form a water tight seal therewith. In instances where such a seal was achieved, the clip often did not remain sufficiently flexible to permit easy installation. An additional problem facing such prior art assemblies was the fact that once the sealing element was formed on the clip, the clip then had to be installed into an article such as a door frame by exerting a sufficient amount of force to overcome the spring bias of the clip. This process often required a significant installation force to be placed on the clip and at least a portion of the sealing element thereon. The application of such installation forces often compromised the sealing between the element and the clip causing it to weaken or tear away. This resulted in an interruption of the moisture proof seal between the sealing device and the clip and rendering the assembly unfit for use.

As a result of the foregoing is apparent that a need exists for a simple, efficient and automated apparatus and method for forming a sealing element on a fastener such as a clip. It is further apparent that the need exists for an improved sealing element on a metal clip that adheres as well or better than prior art designs, and provides a construction that permits installation of the clip with low installation force without compromising the sealing action and leaves the clip sufficiently flexible for easy installation. It is the purpose of the present invention to fulfill the above described needs in the art, as well as other needs apparent to the skilled artisan from the following detailed description of this invention.

SUMMARY OF THE INVENTION

The present invention is directed to a method and apparatus for forming sealing and/or retaining elements on fasteners such as clips, that achieves the above-mentioned requirements in an automated manner. The method and apparatus of the present invention forms a sealing and/or retaining device onto a fastener that has at least two clips, one or more on its upper portion and another on its lower portion, and forms a water-tight seal between those clips in an automated process. The present invention further relates to an automated method and apparatus that forms such sealing elements on clips where the sealing element has a cavity molded therein that permits installation of the clip into a substrate with lower installation force without compromising the adhesion of the sealing element to the clip. Such sealing elements further permit greater flexibility of the clip without compromising the adhesion of the sealing device thereto.

The present invention fulfills the above described needs in the art and provides these and other advantages in a method and apparatus for forming sealing devices on fasteners such as clips and the sealing devices adhered to clips that result therefrom. Present invention further satisfies the needs in the art and provides these and other advantages by providing a novel parts nest and method that carries the fasteners for processing and an endless conveying system that conveys these nests there along in a racetrack configuration where the fasteners are introduced to the conveyor processed with sealing and/or retaining elements and removed from the conveyor in less than one full lap of the conveyor.

These and other advantages are provided in an apparatus for forming sealing element on fasteners comprising a first conveyor, a plurality of fastener nests along the first conveyor system, each of the nest having a chamber, a fastener lock and a fastener release that are moveable to each other, an applicator located along the conveyor that selectively applies material to the nests that have fasteners thereon and a remover for removing fasteners from the nests. These and other advantages are also provided in a method for forming sealing elements on fasteners comprising the steps of conveying a plurality of fastener nests, each of said nests having a chamber, a fastener lock and a fastener release that are moveable relative to each other from a first position wherein said chamber is open to a second position wherein a portion of said lock is located within said chamber to a third position, wherein a portion of said release is in said chamber, introducing fasteners into said chambers of fastener nests while said nest are in said first position, applying material to a predetermined portion of each fastener contained in a nest and heating the fastener nests to a temperature sufficient to cure the material applied in the nests in the applying step and removing the fasteners from the nests.

BREIF DESCRIPTION OF THE DRAWINGS

The present invention has a wide variety of configurations, constructions, operations and results. The invention itself, and its objects, benefits and advantages thereof, will best be understood by reference to the following detailed description, taken in conjunction with the accompanying drawings in which:

FIG. 2 is a side view of the post application heating, staking/cooling and drying stations of one embodiment of the present invention.

FIG. 5 illustrates a partial cross-sectional view of one embodiment of the load station of the present invention taken along the section 5-5 of FIG. 1.

FIG. 14A is a partial cross-sectional view of the application station illustrated in FIG. 14, taken along the section 14A of FIG. 1.

FIG. 20 is a partial cross-sectional view of a preferred embodiment of the parts removal system of the present invention, taken along the section 20-20 of FIG. 1.

FIG. 21 is a partial cross-sectional view of a preferred embodiment of the parts removal system illustrated in FIG. 20, taken along the section 21-21 of FIG. 1, in a lift and remove mode.

DETAILED DESCRIPTION OF THE PREFERRED EMBODIMENT(S)

Figure 3A:
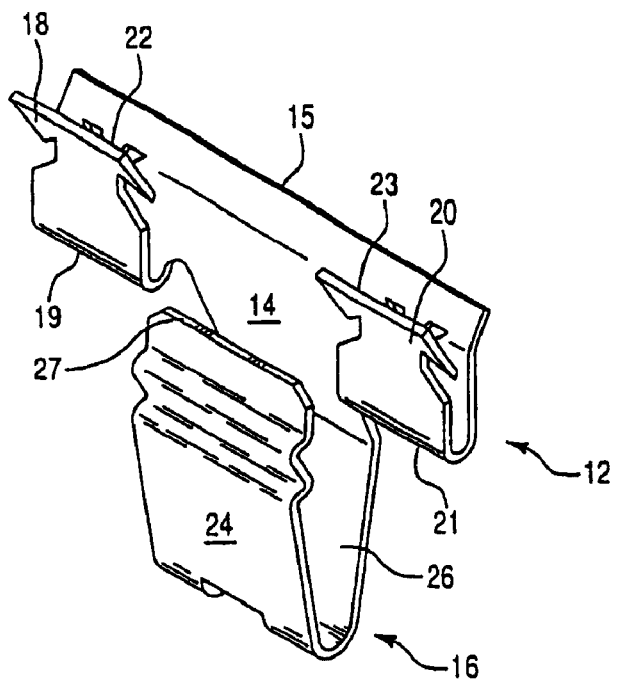
FIG. 3A is a perspective view of an example of a clip that can be processed utilizing the present invention.
Figure 3B:
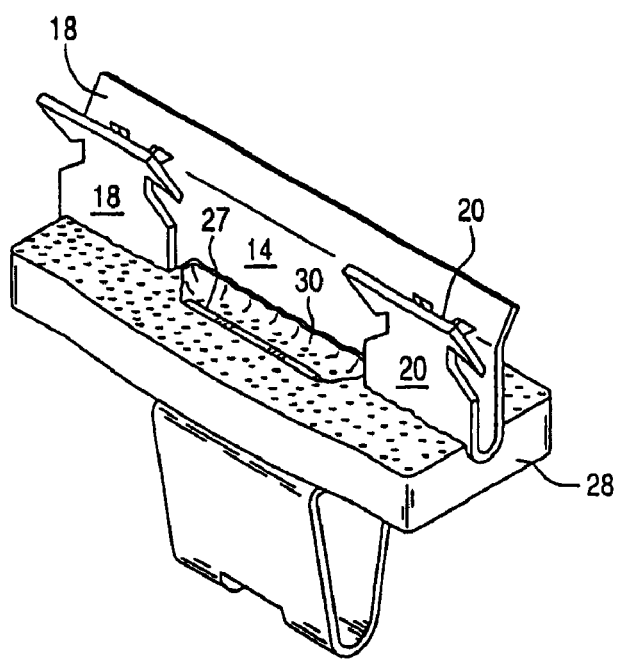
FIG. 3B is an example of a sealing element formed utilizing the present invention on the clip illustrated in FIG. 3B.

This invention will now be described with reference to the drawing figures in which like reference numbers indicate like parts throughout the several views. A particularly preferred embodiment and use of the present invention, namely the molding of a plastisol sealing element to a metal clip as illustrated in FIGS. 3A and 3B, will now be described for exemplary purposes. It will be understood and appreciated by those of skill in the art that the present invention is not limited to forming sealing elements on the particular clips illustrated in FIG. 3A or on retaining clips in general. The present invention can be utilized to form sealing and/or retaining elements on a wide variety of fastening devices other than clips. It will be further understood by those skilled in the art, that the invention is not limited to the formation of the particular sealing element illustrated in FIG. 3B. The present invention permits a wide variety of types, geometries and configurations of sealing and/or retaining elements of different materials to be formed on metal or other substrates.

A typical part that is processed utilizing the present invention by the molding of a sealing element thereto is a metal clip illustrated in FIG. 3A and referred generally at 12. The clip 12 is generally T-shaped and features a central lower clip 16 on its lower portion and two outwardly spaced retaining elements, 18 and 20 respectively, on its upper portion. Each of the retaining elements features a rounded closed bottom referred to as 19 and 21 respectively. The top edges 22 and 23 of the retaining elements 18 and 20 respectively, extend vertically above the main body 14. A portion of the main body 14, forms one side of the lower clip 16 with the front wall 24 forming the remaining part. The lower clip 16 is partially closed at its bottom and open at its top. A gap, generally referred to as 26, exists between the front wall 24 and the main body 14. The design of the lower clip 16 permits limited inward movement of the front wall 24 relative to the main body 14 when a compressive force is exerted thereon to accomplish installation of the clip 12 into a substrate. A biasing force is built into the lower clip 16 that returns the clip to its original position and retains it in the substrate after the compressive force applied during installation is removed.

As generally referred to above, clips such as those illustrated in FIG. 3A are used extensively in a variety of articles of manufacture, including automobiles. One particular use involves inserting the lower clip 16 into a vehicle door frame and engaging trim work in the retaining elements 18 and 20 respectively. In such environments, the lower clip 16 is pressed into a hole in the vehicle door frame or other article of manufacture. Such constructions readily permit moisture or liquid from the upper portion 15 of the clip or thereabove, to freely fall into and collect in the hole that the lower clip 16 is inserted into potentially creating problems as previously described. The present invention forms a resilient sealing element 28, as illustrated in FIG. 3B, on the retaining clip 12. The element forms a completely water-tight seal around a body of the clip 14 and prohibits moisture transfer between the upper portion 15 and the lower clip 16. In the illustrated embodiment, the element 28 is preferably rectangular in shape and completely seals the gap 26 and contacts the bottoms 19 and 21 of the retaining elements 18 and 20 respectively. The sealing element 28, maintains a watertight seal with all portions of the clip 12 that it is adhered to while still allowing the lower clip 16 to remain flexible for easy installation. In preferred embodiments of the sealing element 28, a depression 30 is formed in the upper surface thereof between the top 27 of the front wall 24 and the main body 14 and preferably extends in the opposite direction substantially between the retaining elements 18 and 20. The depression 30 accommodates and positions an installation tool and makes it easier to install a clip having a retaining element formed thereon by the present invention using low installation force that does not compromise the sealing action between the device and the clip.

Figure 1:
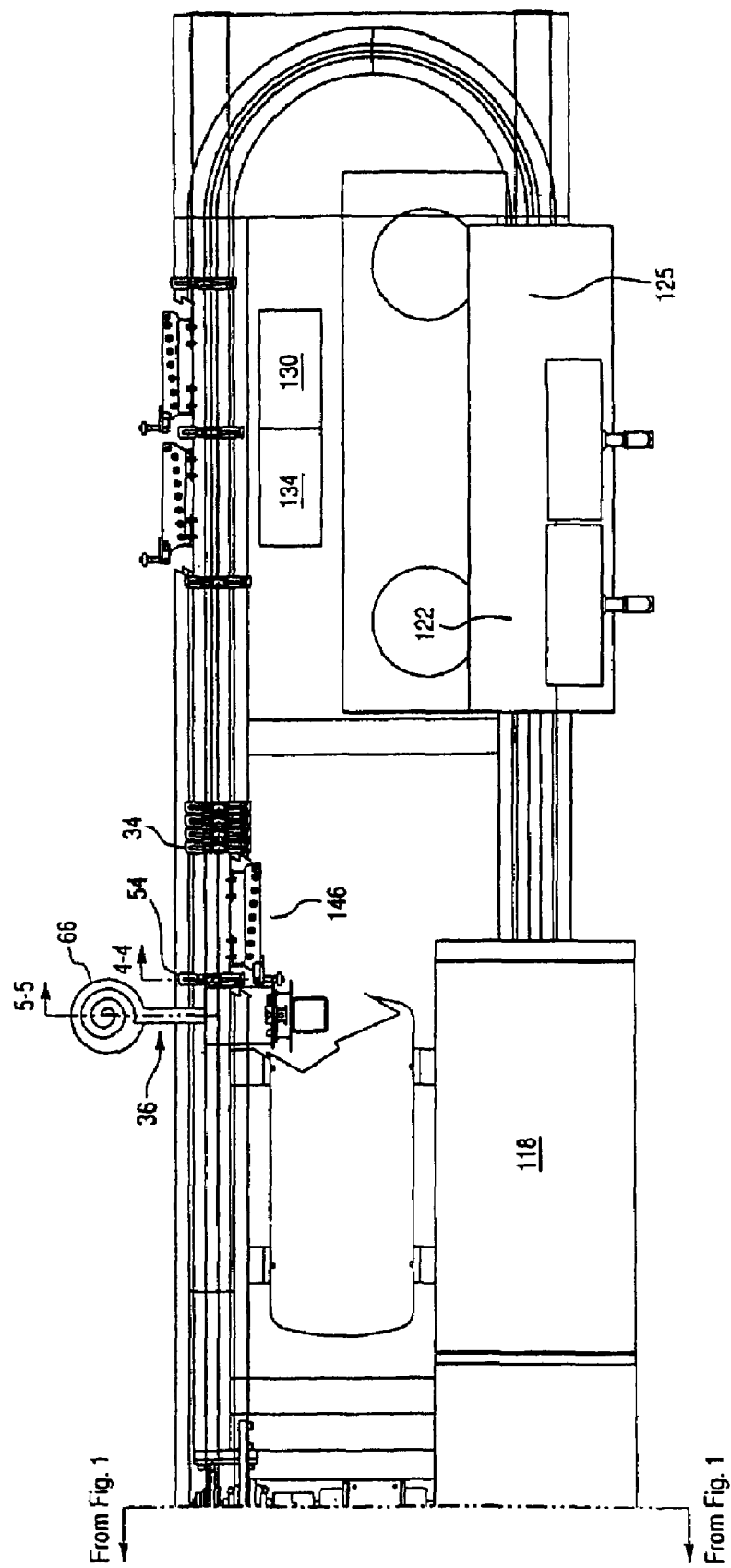
FIG. 1 is a top plan view illustrating the apparatus and sequence of process steps of one preferred embodiment of the present invention.
Figure 4:
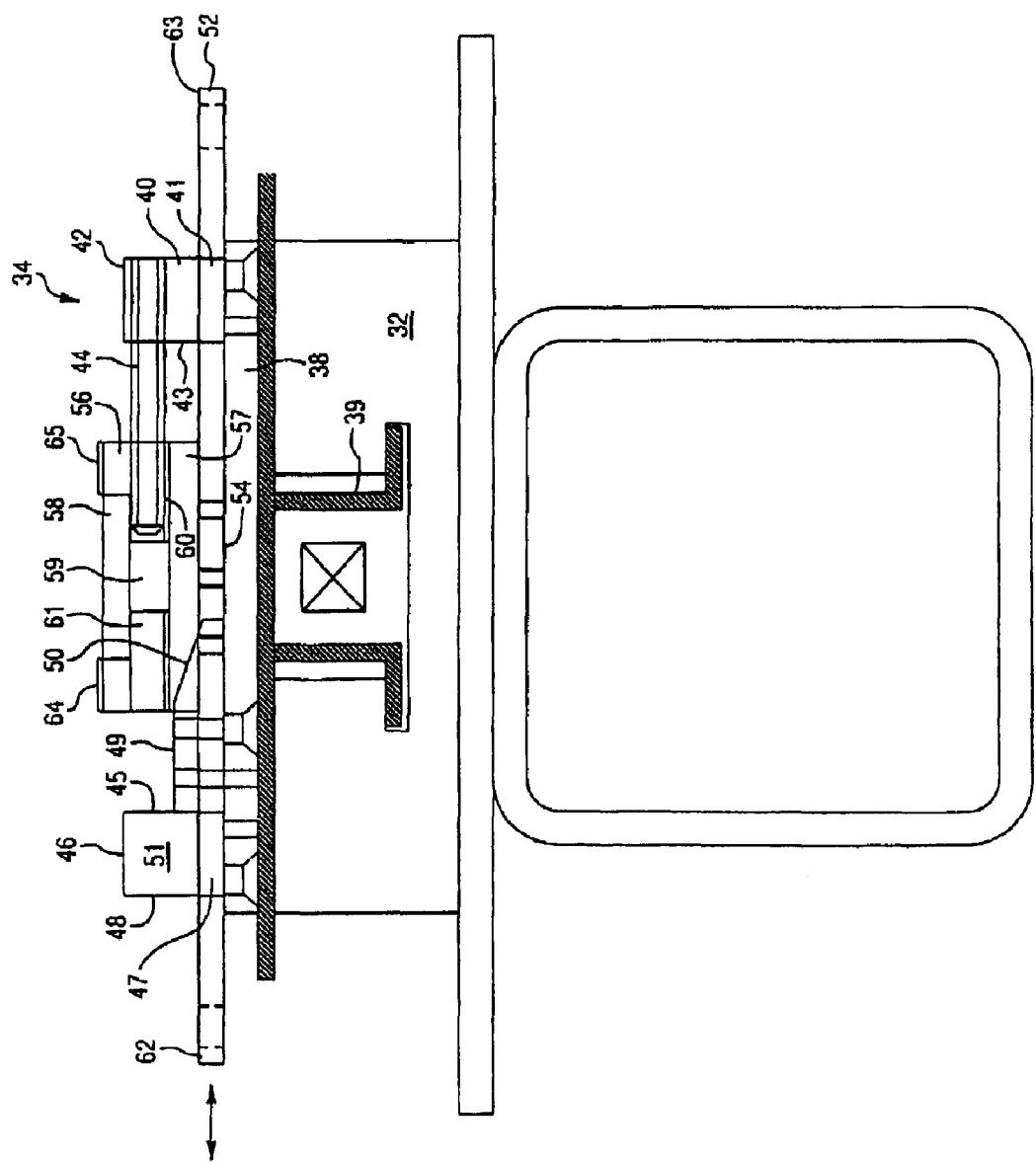
FIG. 4 illustrates a partial cross-sectional view of one embodiment of a parts nest of the present invention in a load configuration taken along the section 4-4 of FIG. 1.
Figure 7:
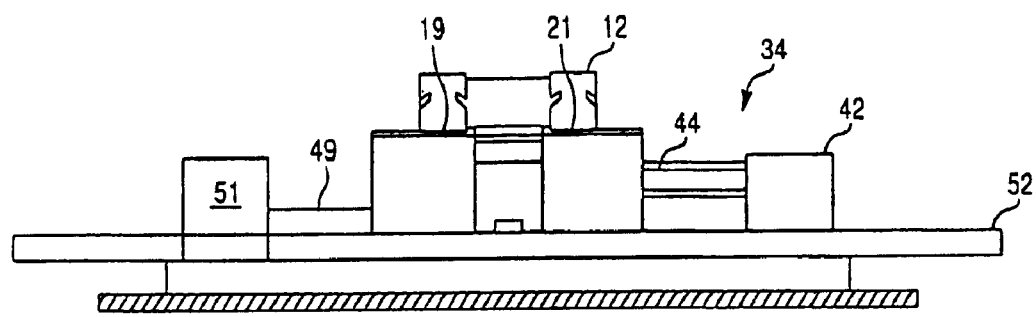
FIG. 7 is a partial cross-sectional view taken along the section 7-7 of FIG. 1 illustrating a preferred embodiment of a parts nest of the present invention with a clip loaded and seated therein.

The novel sealing element of the present invention provides further advantages and benefits in that it can be formed on a retaining clip or the like in an automated process. One such preferred processing system is illustrated in FIG. 1 and generally referred to as 10. The system 10 relies upon a conveyor 32 running the entire length thereof to carry clips 12 through a variety of stations, each in a parts nest 34 that is moved by the conveyor as illustrated in FIGS. 4 and 7. The conveyor 32 is preferably provided with a plurality of parts nests 34, each of which accommodates a single clip 12. The parts nests 34 are also preferably spaced uniformly and adjacent to one another in order to maximize processing speed for the clips 12.

Parts processed in accordance with the system 10 of the present invention are preferably processed along a single conveyor 32 obviating the need to transfer the parts to or from multiple conveying systems. A variety of different geometries, such as a single linear conveyor can be used. A particularly preferred arrangement of the system 10 and conveyor 32 of the present invention is a racetrack type configuration such as is illustrated in FIG. 1. Such a configuration has several advantages. First, it minimizes the floor space needed for the overall system. This configuration also permits the processing of clips, or other parts, in slightly less than one lap of the conveyor. The layout of this particular configuration also affords a benefit in that it provides two opposed extended length linear sections where all of the processing and handling of parts can take place. It likewise has two small turn sections, one at either end, that maximize the length of the conveyor dedicated to processing and minimize the floor space necessary for the overall system.

A preferred embodiment of the system 10, illustrated in FIGS. 1 and 2 will now be described as utilized to form sealing elements on metal retaining clips as illustrated in FIG. 3B. In order to form a sealing element 28 on a succession of retaining clips 12, the clips must be first placed in movable parts nests 34 along the conveyor 32. Parts can be placed in the individual parts nest 34 either manually or automatically. In the illustrated embodiment the retaining clips 12 are automatically loaded into successive parts nests 34 in the auto load area 36 of the system 10. Each parts nest 34 is movable between three different positions, an open or load position, a locked or gated position and an unload position as will be described more fully below.

Figure 6B:
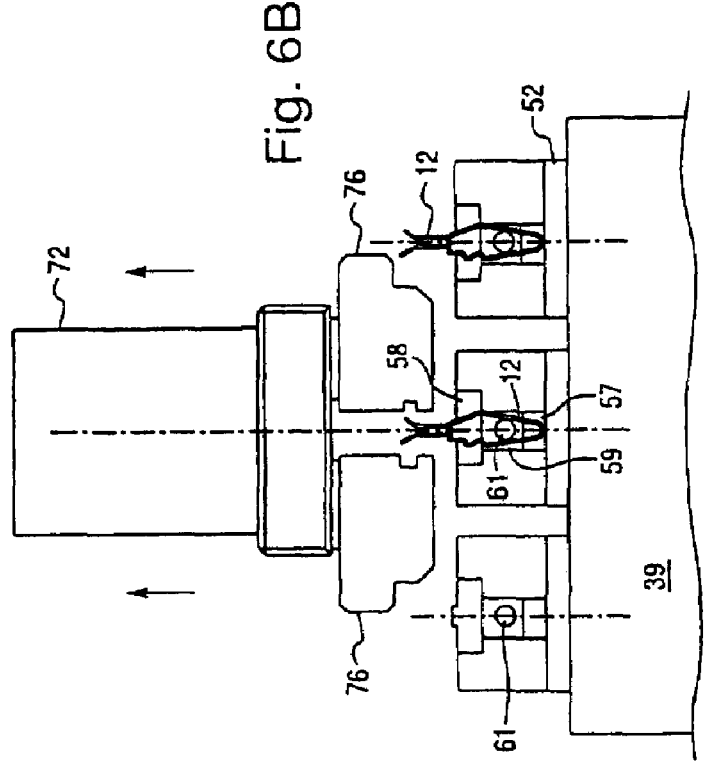
FIG. 6B is a partial side plan view taken of the parts loader illustrated in FIG. 6A in a release or finish position.
Figure 6A:
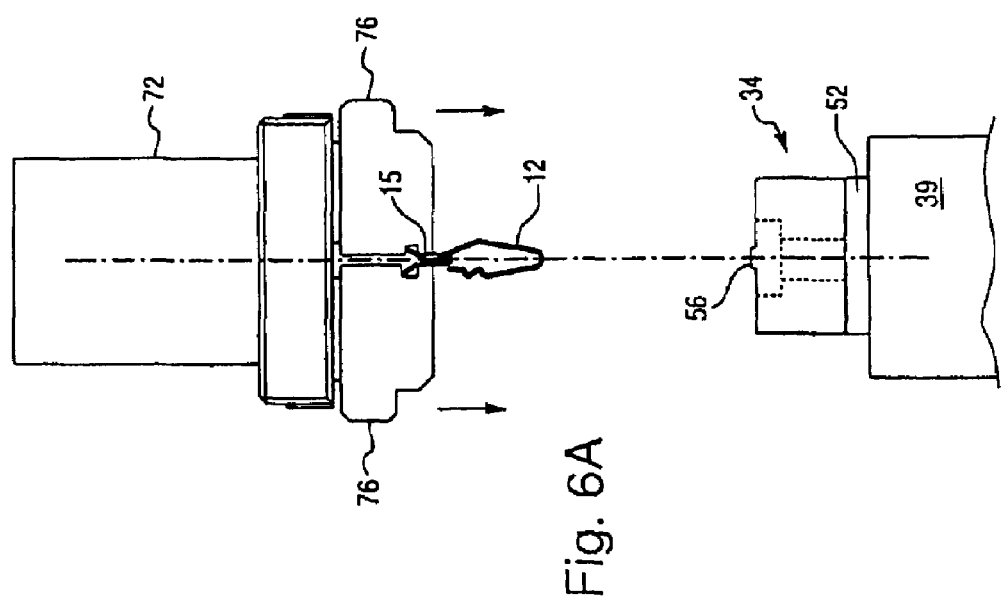
FIG. 6A is a partial cross-sectional view taken along the section 6-6 of FIG. 5 illustrating one embodiment of an automatic parts loader of the present invention.

Referring to FIGS. 4, 6A and 6B, each parts nest 34 has a base 38 that is removably attached to the conveyor 32 by a plate 39 by screws or other known attachment mechanism. Centrally mounted along the top surface of the base 38 is a dowel pin holder 40. The holder 40 has a narrow base 41 and an extended body 42 above the base. A dowel pin 44 extends outwardly from the inner face 43 of the body 42. Mounted near the opposite end of the base 38 is a stop 46. The stop 46 preferably has a wide main body 51 with an angled top 48 that is located above and supported by a narrow bottom 47. A part remover 49 also projects upwardly from the base 38. The remover 49 is preferably located adjacent to the inboard surface 45 of the stop 46. The part remover features an angled inboard surface 50 and is axially aligned with, but vertically spaced from, the dowel pin 44.

The parts nest 34 has a slide 52 that is journaled for a limited degree of sliding movement along the top of the base 38. The slide 52 features a central rectangular slot 54. A portion of the holder base 40, stop bottom 47 and remover 49 are located within the slot 54. A parts holder 56 is rigidly attached to the top surface of the slide 52. The holder 56 has a mold cavity 58 and a central chamber 59 below the cavity. Dowel pin passageways 60 and 61 respectively, extend from the central chamber 59 through the parts holder 56 to opposite ends thereof. The parts holder 56 also has a channel 57 that runs along its entire length under the passageways 60 and 61. The channel 57 is dimensioned to permit free movement of the part remover 49 therethrough. The slide 52 also has angled end portions 62 and 63 respectively, that engage various cam rollers of the system 10 and shuttle the slide 52 and the holder 56 attached thereto along the base 38. Axial movement of the holder 56 is limited at one end by the inner face 43 of the dowel pin holder 40 and by the inboard surface 45 of the stop 46 at the other end. Vertical movement of the slide is prohibited by the under surfaces of the stop body 51 and dowel pin holder body 42 on one side and the base 38 on the other side.

As the slide 52 shuttles along the base 38, the parts remover 49, stop bottom 47 and pin holder base 41 all move within the slot 54. The top surface of the parts holder 56 is also provided with guides 64 and 65 that assist in aligning and stabilizing the clips 12.

In order to accomplish the automatic loading of the clips 12 into successive parts nests 34, the nests must be in their center or load position as illustrated in FIG. 4. In this position the dowel pin 44 is journaled within the passageway 60, and the mold cavity 58 and central chamber 59 are completely open. With the nests 34 in this position, the clips 12 are then introduced in bulk into a vibratory feed bowl. The feed bowl 66 separates, uniformly orients and exits the clips in a continuous side-by-side manner. Although a variety of known bowls are equally suitable to accomplish this purpose, such as those manufactured by Feed Rite Automation having a high/low limit.

The bowl 66 next feeds the clips 12 into an inline feeder 68, as illustrated in FIG. 5. The feeder 68 acts as a parts accumulator and brings the clips 12 into position for automatic loading into the successive parts nests 34. A parts present switch 70 is used to detect whether a clip 12 is present at the end of the inline feeder 68. When the switch 70 detects a clip as described, it sends a signal to the escapement 74 on the inline feeder 68. Upon receipt of the signal the escapement 74 then releases one clip into the jaws 76 of the load station 72 as illustrated in FIGS. 5 and 6A.

A proximity switch 71 is provided on the load station 72 behind the jaws 76. When the switch 71 detects that a clip 12 is fully inserted in the jaws 76 a downward movement of the load station 72 is triggered. This movement continues until the load station arm 73 moves into contact with the stop 46 of the nest 34. The load station 72 is then locked onto the moving nest 34 through the contact of the arm 73 with the stop 46 causing them to travel together. As the load station 72 travels with the nest 34 with the jaws 76 grasping the upper portion 15 of the clip 12, the station 72 lowers the clip 12 down into the parts holder 56 of the nest 34. Once the clip 12 is positioned in the nest 34, the jaws 76 release the clip and the load station 72 moves up, leaving the clip 12 position in the nest 34 as illustrated in FIG. 6B. As the station 72 retracts, the load station arm 73 then releases from the nest 34 ceasing further travel of the station 72 with the nest 34. The station 72 then returns to its original position adjacent the inline feeder 68 to wait for the next clip 12 to be inserted therein and to lock onto the next nest 34 as described.

As illustrated in FIG. 5, once a clip 12 is loaded and seated in a nest 34, the bottom of the lower clip 16 is contained within the mold cavity 58, chamber 59 and channel 57 and retaining element bottoms 19 and 21 respectively, rest on the guides 64 and 65. As the nests 34 continue to move along the conveyor 32, they next encounter the manual load and inspection area 78. In this area, if the system 10 is not utilizing an automatic load capability then parts can be manually loaded into the moving parts nests 34 over an extended linear distance that permits two individuals to accomplish this task. If an automatic loading procedure is being used then this area can be used as a manual inspection area where an operator can visually inspect the clips 12 in the moving parts nest 34 to insure that they are properly seated.

Figure 8:
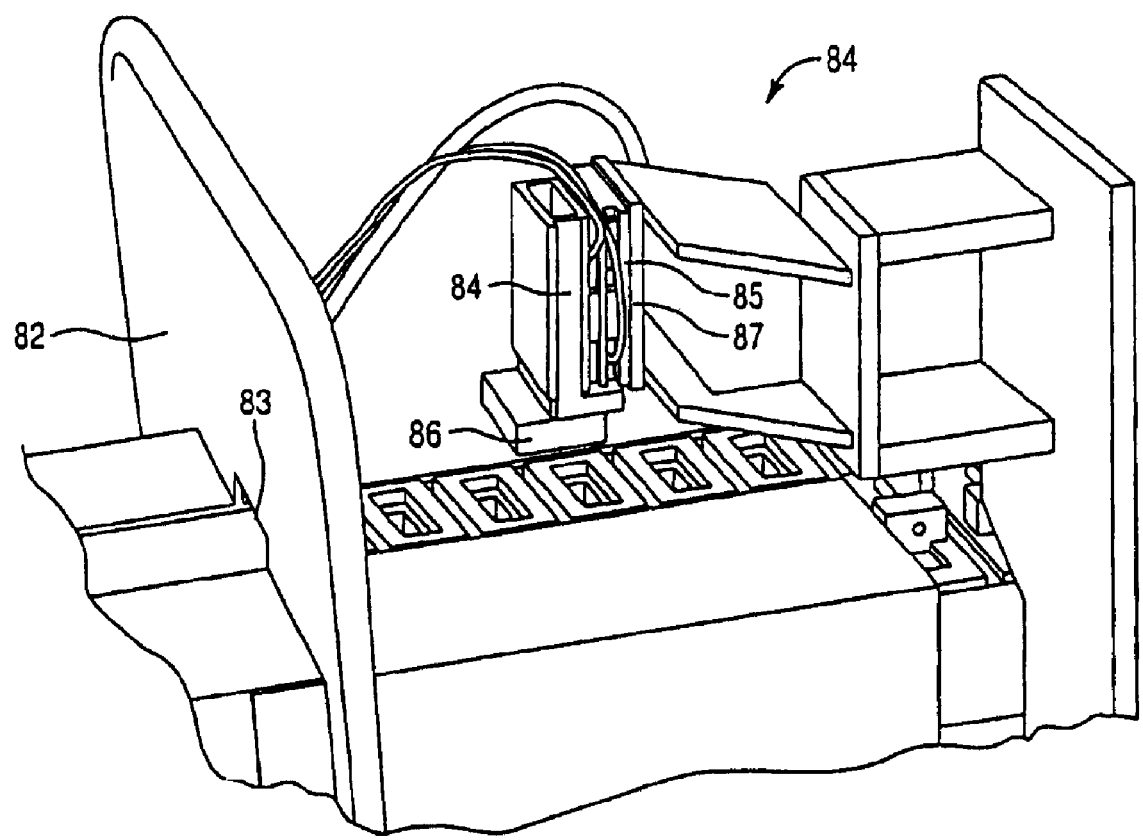
FIG. 8 is perspective view of an embodiment of a parts profile gate and redundant parts nester of the present invention.
Figure 9:
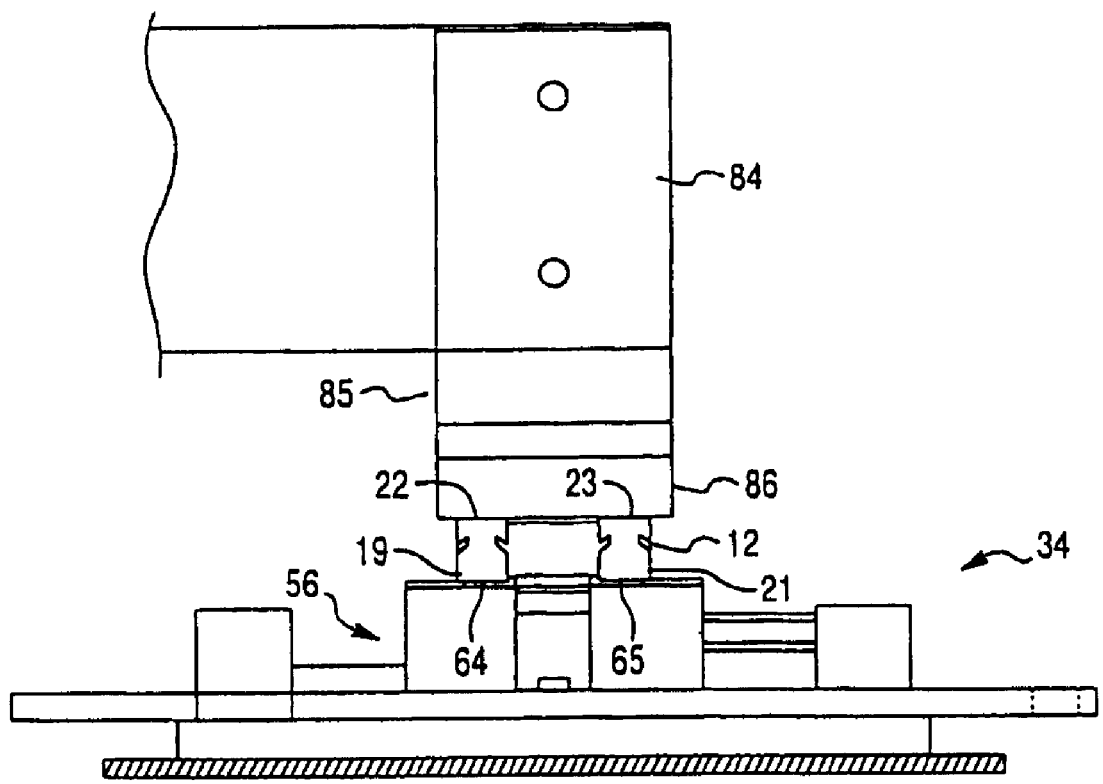
FIG. 9 is a partial cross-sectional view taken along section 9-9 of FIG. 1 of a preferred embodiment of the redundant parts nester illustrated in a contact position with a clip.

As the parts nests 34 leave the manual load and inspection station 78 they are next transported to a redundant parts nesting station 80. Referring particularly to FIGS. 1, 8 and 9, station 80 features an optional parts profile gate 82 and an orientation and staking device 84. The gate 82 is a plate with a profile opening 83 located at its bottom that is dimensioned to allow a clip 12 that is properly aligned and positioned in a parts nest 34 to pass therethrough and to force any severely misaligned or improperly nested clips to be removed from the nest 34 and continue no further along the conveyor 32.

After the nest 34 with a properly aligned and loaded clip passes through the gate 82, the conveyor 32 moves the nest toward the orientation and staking device 84. The device 84 first senses whether the clip 12 is properly oriented in the nest 34 through the use of a sensor 85. A variety of different sensors can be used for this purpose however it has been found that an optical sensor such as a model BOS 26K-PA-ILH8-54-C made by Balluff, Inc. has been found to perform well in this environment.

The device 84 next insures that the clip 12 is adequately installed and it is facing the proper direction within the nest 34 such that the bottom of the clip 12 is sufficiently within channel 57 and the bottoms 19 and 21 of the retaining elements are in contact with the guides 64 and 65. When a nest 34 is sensed by the sensor 85, a vertically movable air cylinder mounted pusher block 86 on the device 84 moves downward to engage and exert a downward force on the top edges 22 and 23 of the clip 12 to ensure that it is completely and properly nested within the parts holder 56. The orientation and staking device 84 also registers a bit corresponding to each parts nest 34 that passes thereby. Each identifying bit is stored along with information corresponding to the particular nests in a computer such as a central controller 88. A variety of different computers or controllers can be utilized for this purpose. One such controller is a Micro-Logics 1500 programmable logic controller made by Alan Bradley with an LCD touch screen. The controller can receive input from all of the sensors and switches located on the system and controls all of the machine functions either in manual or automatic run cycles. Many system functions can be changed or monitored using the controller display.

The device 84 is provided with three different switches generally referred to at 87. A variety of known commercially available switches can be used for this purpose such as a model D-A93L proximity switch sold by SMC Corporation. The first switch senses when the pusher block 86 is in a retracted position. The two remaining switches are for the extended or downstroke position of the pusher block 86. When a clip 12 is correctly installed in the parts nest 34, the clip 12 will limit the downward stroke of the pusher block 86. This triggers the first down switch to send a bit to the controller 88 to signify that a part is present and properly seated in that particular nest and that material should be applied as that identified nest 34 passes through the material application station 106. If a clip 12 is backwards in a nest 34 then the downward stroke of the pusher block 86 falls short of the first downstroke switch contact and the switch will not be triggered. This condition will set a machine fault signal alarm regarding the identified nest to the controller 88. If there is no clip present in a nest 34 then the pusher block 86 will travel downwardly to its fully extended position and the second downward switch will make contact. This will set a bit in the controller 88 indicating that there is no clip located in that identified nest. This information is relayed to the material application station 106 by the controller 88 and no sealant is applied to any identified empty parts nests 34 as they pass through the material application station. The redundant parts nest station 80 is important since an improperly nested part could potentially cause the machine to jam.

Figure 10:
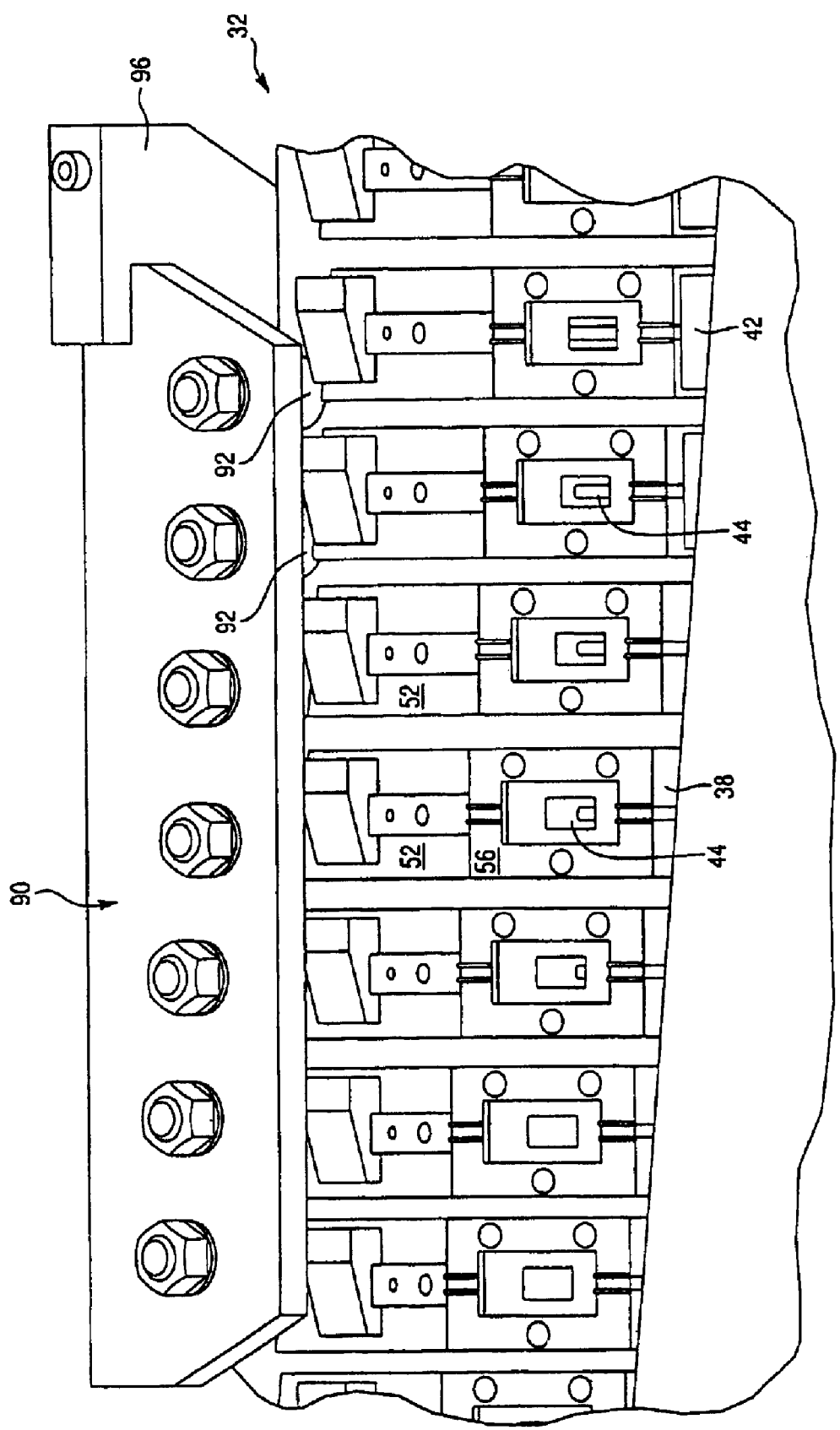
FIG. 10 is a perspective view of one embodiment of a series of cam rollers contacting parts nests.

As the parts leave the station 80, the clips 12 are properly aligned and oriented in the nests 34, likewise any nest 34 without a clip 12 therein has been appropriately identified and recorded by the controller 88. The parts nest 34 then continues along the conveyor 32 and encounters a nest slide shuttle 90 illustrated in FIGS. 1 and 10. The shuttle has a series of cam followers 92 that are angled toward the outer portion of the conveyor 32. As the nests 34 encounter the followers 92, they engage the angled end 62 of the slide 52. This causes the slide 52 to move along the base 38 until the parts holder 56 comes into contact with the inner face 43 of the dowel pin holder 40. This movement causes the dowel pin 44 to pass completely through the central chamber 59 and into the passageway 61 of the parts holder 56. As a result, the dowel pin 44 substantially fills in the gap 26 in the clip 12 and captures and gates the clip in the parts nest 34 thereby completing the floor of the mold cavity 58 to contain the material that will be applied to form a sealing device on the clip.

Figure 11:
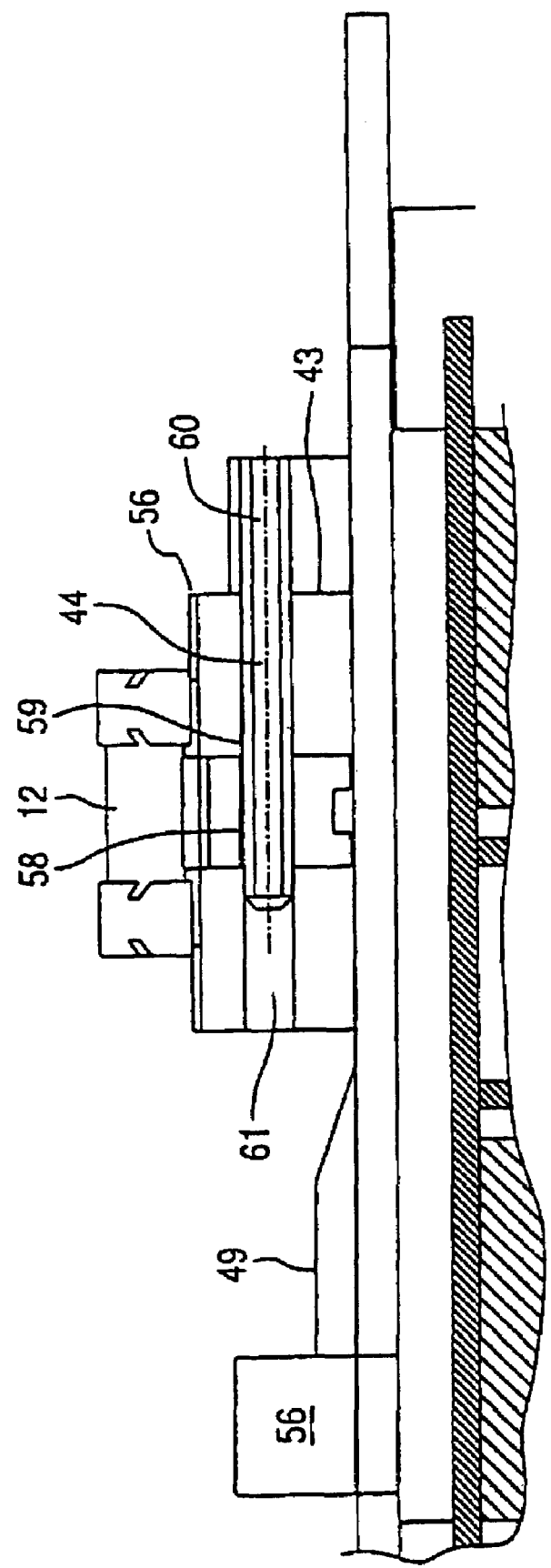
FIG. 11 is a partial cross-sectional view of a preferred embodiment of a parts nest in a loaded and gated position taken along the section 11-11 of FIG. 1.

Once in the position illustrated in FIG. 11 the clip 12 is ready to have a sealing device formed thereon. A spring loaded overload switch 96 is provided in proximity to the cam followers 92. If a situation is encountered where the cam followers 92 cannot move a slide 52 of a nest 34 to a fully gated position, then this will cause sufficient pressure to move the overload switch 96, indicating that a jam is present. The switch 96 will then cause the conveyor 32 to stop. Any such stopping of the conveyor 32 will send an appropriate signal to the controller 88.

Figure 12:
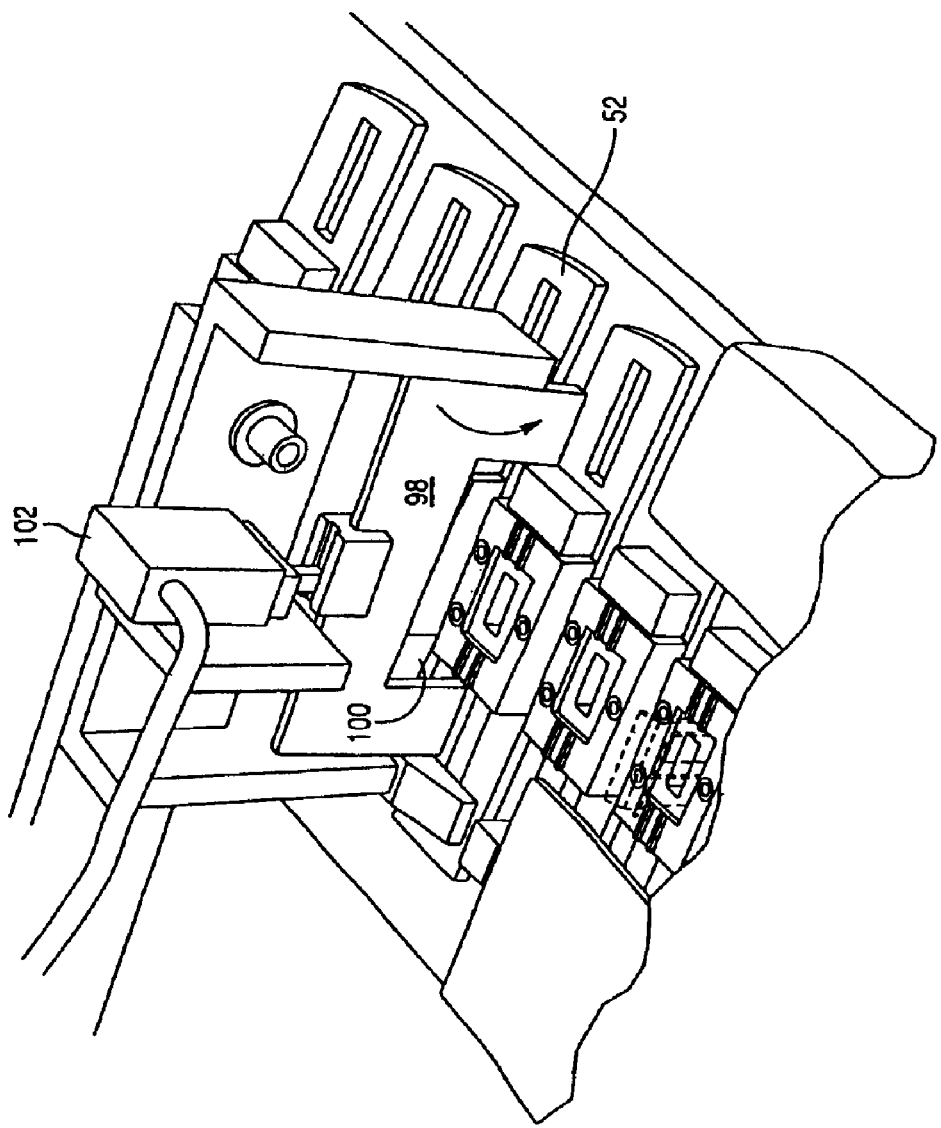
FIG. 12 is a perspective view of a preferred embodiment of an embodiment of an error detection device of the present invention.

As Illustrated in FIGS. 1 and 12, the nests 34 with clips 12 loaded and gated therein, continue along the conveyor 32, they next encounter another optional parts profile gate 98. The gate 98 has an opening 100 that is dimensioned to allow only clips that are properly seated and aligned in nests to pass there through. If a clip is not properly seated in a nest or if an additional clip or other foreign matter is located elsewhere on the nest, then the contact of such a clip or foreign object with the gate 98 will cause it to rotate out of a vertical position. This results in the tripping of a contact sensor 102, which then sends a signal to the controller 88 that will stop the conveyor 32.

Figure 13:
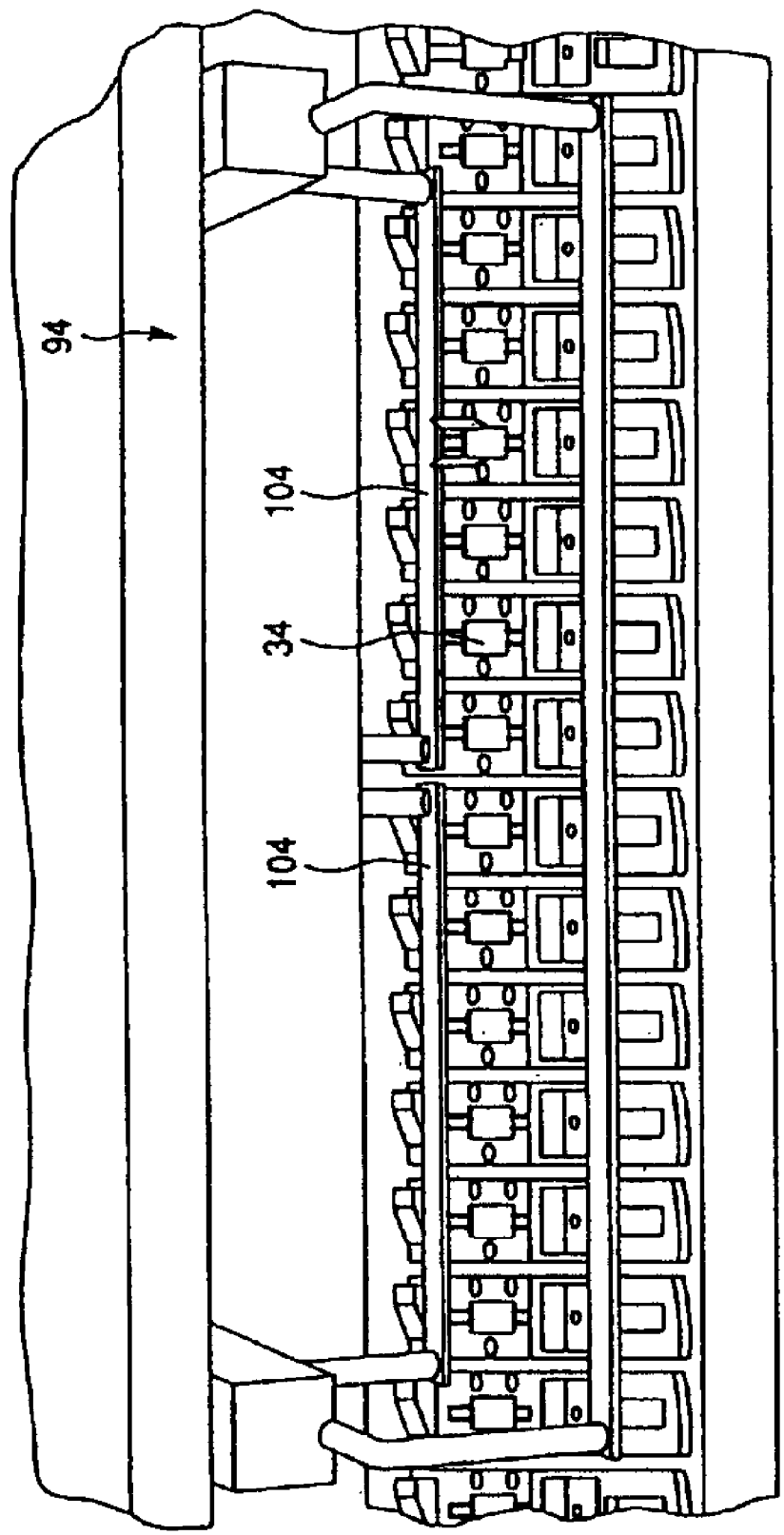
FIG. 13 is a side view of a preferred embodiment of a pre-application heating device.

After the nests 34 passes through the gate 98, the conveyor next moves the nests 34 through an optional pre-heating station generally referred to as 94. Although this station is not necessary in all instances, it has been found that it is often preferable to pre-heat both the parts to be processed and the nest prior to the application of any material thereto. It will be understood by the skilled artisan that a variety of different heating sources could be utilized. In the described preferred embodiment of applying a sealing device 28 to a clip 12, it has been found that use of an induction-heating coil 104 as illustrated in FIG. 13 has achieved favorable results. An induction heating coil utilized in the described exemplary embodiment, that provided consistent successful results, was approximately 20 inches long and utilized an Interpower model number 1PC-1HF-60 induction heating unit.

A wide variety of temperatures are achievable at the preheat station from slightly above room temperature to 750° F. Within this range, parts and nests can be selectively heating to a temperature at or near the melt or cure temperature of the applied material. The preferred range for pre-heating the nested clips 12 in order to apply plastisol sealing devices to them in the described preferred example was found to be 200° to about 250° F. and most preferably about 250° F. Increasing the temperature of the nest 34 and the clip 12 to the approximate cure temperature of the plastisol material serves to begin solidifying the material once it is applied and keep it from running down from the mold cavity 58 into the central chamber 59.

Figure 14:
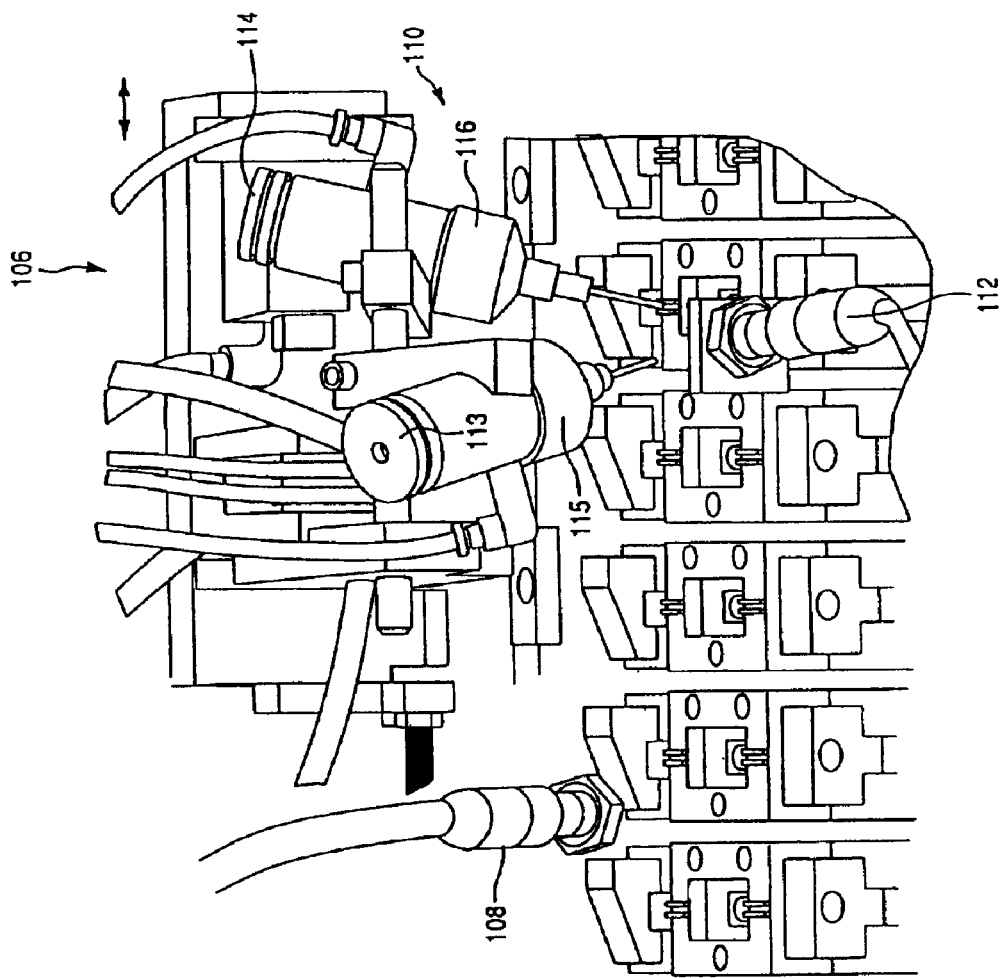
FIG. 14 is a side view of a preferred embodiment of the application station of the present invention.

With the nest 34 and clip 12 contained therein and preheated to approximately 250° F., the nest 34 next proceeds along the conveyor 32 to the material application station 106 illustrated in FIGS. 14 and 14A. A variety of different materials can be applied at the application station including plastisols, cyanoacrylates, PVC sealants, epoxy, silicone, nylon and evalon in liquid or powder form. Additionally, materials that are curable by exposure to an ultraviolet light source may also be applied at this station. It has been found that a particularly preferred material for forming of the described sealing device on the clip illustrated herein is a liquid plastisol having a blowing agent in it. A plastisol material of this type that has been found to achieve beneficial results is model number JX 76-A black, manufactured by Lakeside Plastics.

As each heated nest 34 moves through the application station 106, a bit is picked up from the nest 34 by a proximity sensor 108 and compared to the previous data stored in the controller 88 for that particular nest. This data results in an instruction to the application station 106 to only apply material to those nests 34 previously identified at the nesting station 80 as having a properly seated clip present.

The device 10 and controller 88 always know which particular nest is at the application station as well as the exact time that it is present because a fixed number of nests are located between the nesting station and the application station. Assuming a clip is located on the nest, the nest 34 can next be optionally passed through a pyrometer that senses the temperature of a series of successive nests to confirm that the temperature is sufficiently close to a pre-desired value to apply material thereto. If this condition is satisfied then sealant material will be applied thereto. If this condition is not met, then no material will be applied and a signal identifying this condition and the particular nests that it applies to will be sent to the controller 88 which will forward this information to the bad part eject station 130 for removal. This information can also be utilized to either manually or automatically adjust to the power potentiometer at the preheat station 44.

An optional parts present sensor 112 such as an optical sensor or proximity switch can also be utilized to confirm whether a clip 12 is contained in a nest 34. If the sensor 112 does not sense a clip 12, then a message is sent to the controller 88 and the applicator 110 applies no material to the clip 12. If the sensor 112 senses that a clip 12 is present then it causes the applicator 110 to shift down until it is in close proximity with the nest 34. When the applicator 110 is in the downward or extended position a cylinder arm 111 engages the stop 46 on the nest 34. This causes the applicator 110 to follow the axial travel of the nest 34 until the cylinder arm 111 retracts.

While the nest and applicator travel together, the applicator 110 applies the plastisol or other material to a point where it almost fills the mold cavity 58 to accommodate for the expansion of the plastisol due to the blowing agent contained therein. The plastisol or other material is fed from a pressure pot (not shown) to a pair of liquid dispensing guns 113 and 114 respectively. The guns dispense discrete shots of material only when appropriately identified nests are located below. Material does not continuously issue from the guns The guns 113 and 114 are maintained in a pre-selected position by stages 115 and 116. The stages allow the guns to achieve a wide variety of pre-selected positions in three different dimensions. Both the pressure of the plastisol material fired from the guns 113 and 114 and the time of the application of the material from the guns is selectively controllable. In the particular embodiment described it has been found that use of guns made by EFD (Model # 752V-UH), fed with plastisol at 40 psi of pressure from a pressure pot, and using an operating pressure of 35 to 40 psi and a nominal 21 second time setting resulted in particularly preferred results. Although one or more guns can potentially be utilized, in the illustrated example it was found that two guns were preferable because the mold cavity 58 is almost cut in half by the clip 12 that is nested in it. Once the guns have applied the desired amount of plastisol material to the cavity 58 they cease any further application. The applicator 110 reaches the limit of permitted horizontal travel causing the applicator 110 to be raised to its upward position. This results in the cylinder arm 111 disengaging the stop 46. The applicator 110 then ceases traveling with nest 34. The applicator 110 is then returned by backtracking it horizontally along the conveyor to its original starting position to apply material to succeeding nests 34 using the above-described procedure.

With the plastisol material applied in the mold cavity 58, the nest 34 then moves into a post heat zone 118. While a variety of different heat sources can be utilized in this zone, it has been found that a particularly preferred heat source is quartz lamps with solid-state control relays such as those available from Chromalox (part # 7810-101323-F01). This permits fine tuning to compensate for variations in ambient temperature and nest conveyor speed variations.

Figure 15:
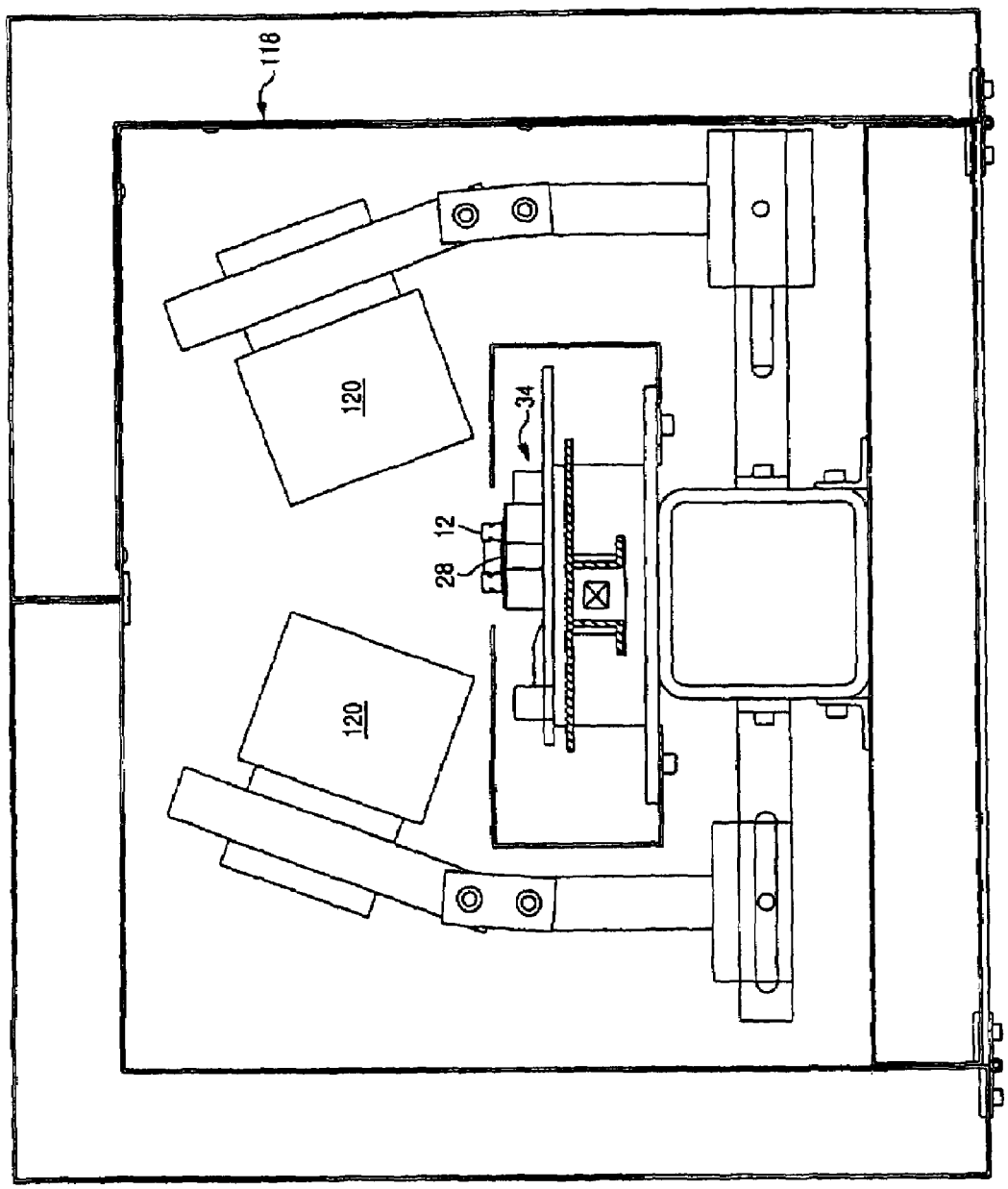
FIG. 15 is a cross-sectional view of the post application heating station, taken along the section 15-15 of FIG. 2.
Figure 16:
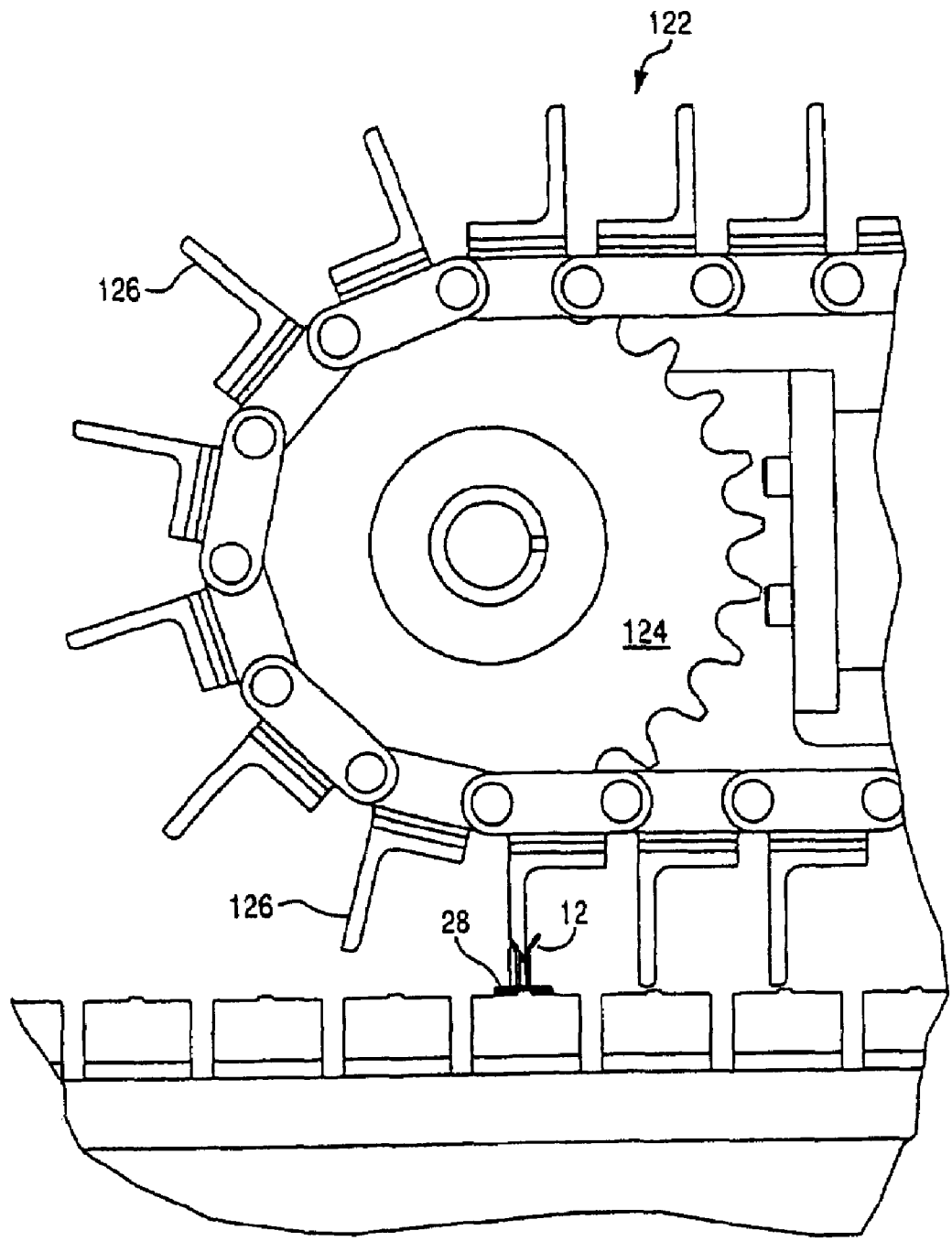
FIG. 16 is a side view of a portion of the staking and cooling device of the present invention.

A typical arrangement of quartz lamps 120 within the post heat zone 118 is illustrated in FIG. 15. The object of the post heat zone 118 is to keep the nest 34 and clip 12 at a sufficiently high temperature to help heat the plastisol applied to the clip to assist the top coat curing of the material. It has been found that it is usually necessary to raise the temperature in the heat zone above the cure temperature of the plastisol to accomplish this purpose. A particularly preferred arrangement of the post heat zone utilized to cure the plastisol described in this preferred embodiment, having a cure temperature of 250° was to have three different zones in the oven, the first heated to about 400° F., the second heated to about 300° F. and the third heated to about 200° F. The post heat zone 118 may also include an optional ultraviolet light source that can be utilized to assist in the curing of any UV curable material applied at the application station 106. The nest 34 with the molten plastisol material applied to the clip 12 therein, next moves to a staking and cooling station 122. Referring to FIG. 16, the station 122 has an overhead conveyor 124 with a series of equally spaced wedges 126 therealong. In certain preferred embodiments the wedges 126 have an angled bottom. The spacing of the wedges 126 matches that of the nests 34. As a wedge 126 rotates down, it is driven into the molten plastisol in the nest at a location between the main body 14 and the top 27 of the lower clip 16 and as a result forms a depression 30 in that area as illustrated in FIG. 3B. The wedge 126 provides an added benefit of providing an even downward force that aligns the clips 12 inside the respective cavities 58 thereby insuring that the clip is still perpendicular with the cavity.

Figure 17:
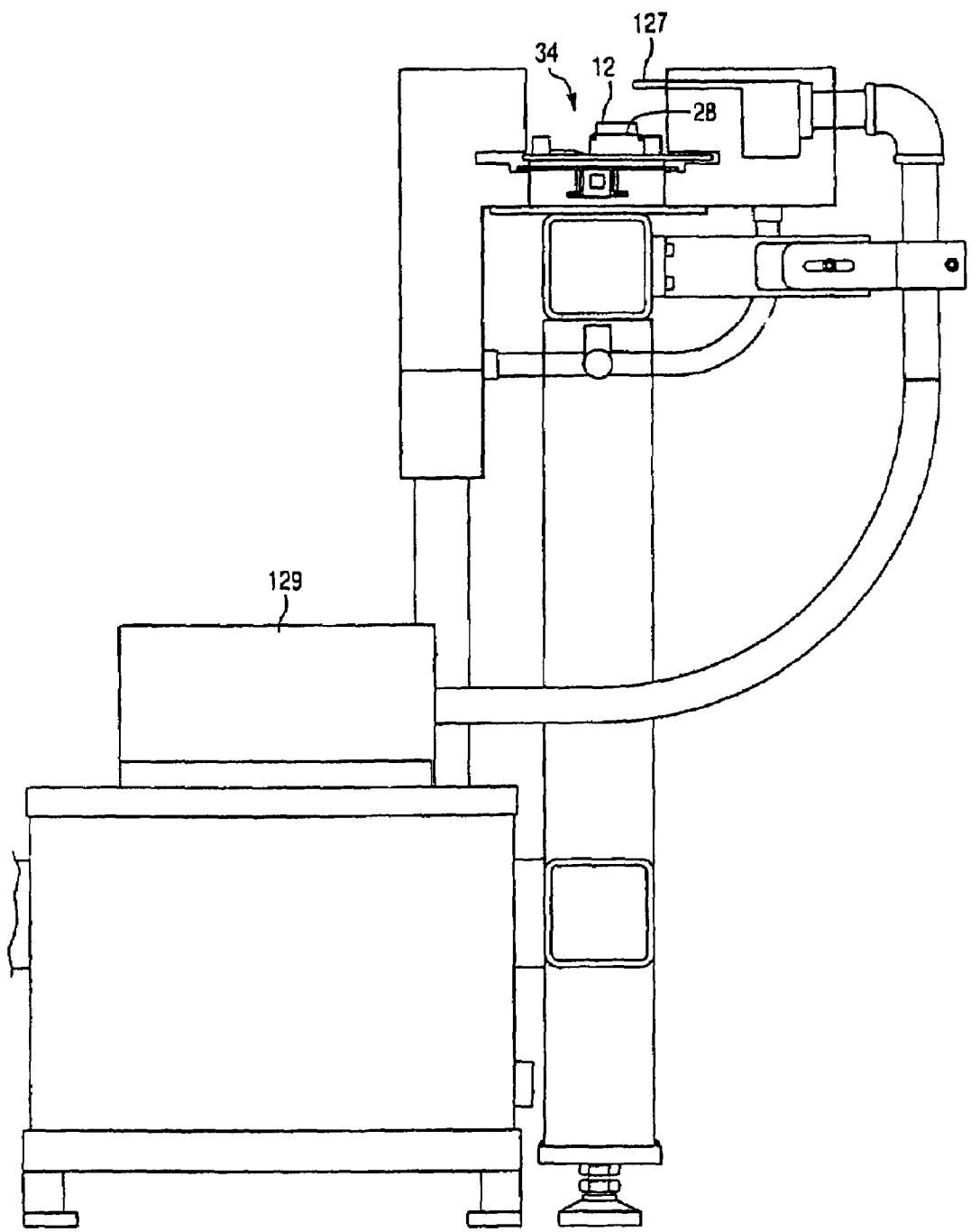
FIG. 17 is a cross-sectional view of a preferred embodiment of a coolant station of the present invention taken along the section 17-17 of FIG. 2.

As the nest 34 continues to move with the wedge 126 partially in the applied plastisol, the nest moves under a stream of coolant issuing from a coolant head 127 that is fed from a pressurized pump as illustrated in FIG. 17. This serves to assist the solidification of the now cured plastisol while leaving depression 30 in the finished sealing element 28. As previously described, this depression makes it easier to install the clip with low installation force without compromising the sealing action of the sealing device. Although a variety of different cooling materials can be used, a particular preferred material is a combination of a mold release solution and water-soluble oil. A number of known solutions such as a Stuart Bosco 1110 Super Soluble Base can be used for this purpose.

As the nest 34 continues down stream, the wedge 126 pulls away from, and out of the depression 30 while the now formed sealing element 28 is still being cooled by the coolant. The nest is subsequently air dried either by forced air from one or more fans 129 or by exposure to ambient air. At this point the sealing element 28 is completely formed and sealed water-tight to the clip 12.

Figure 18:
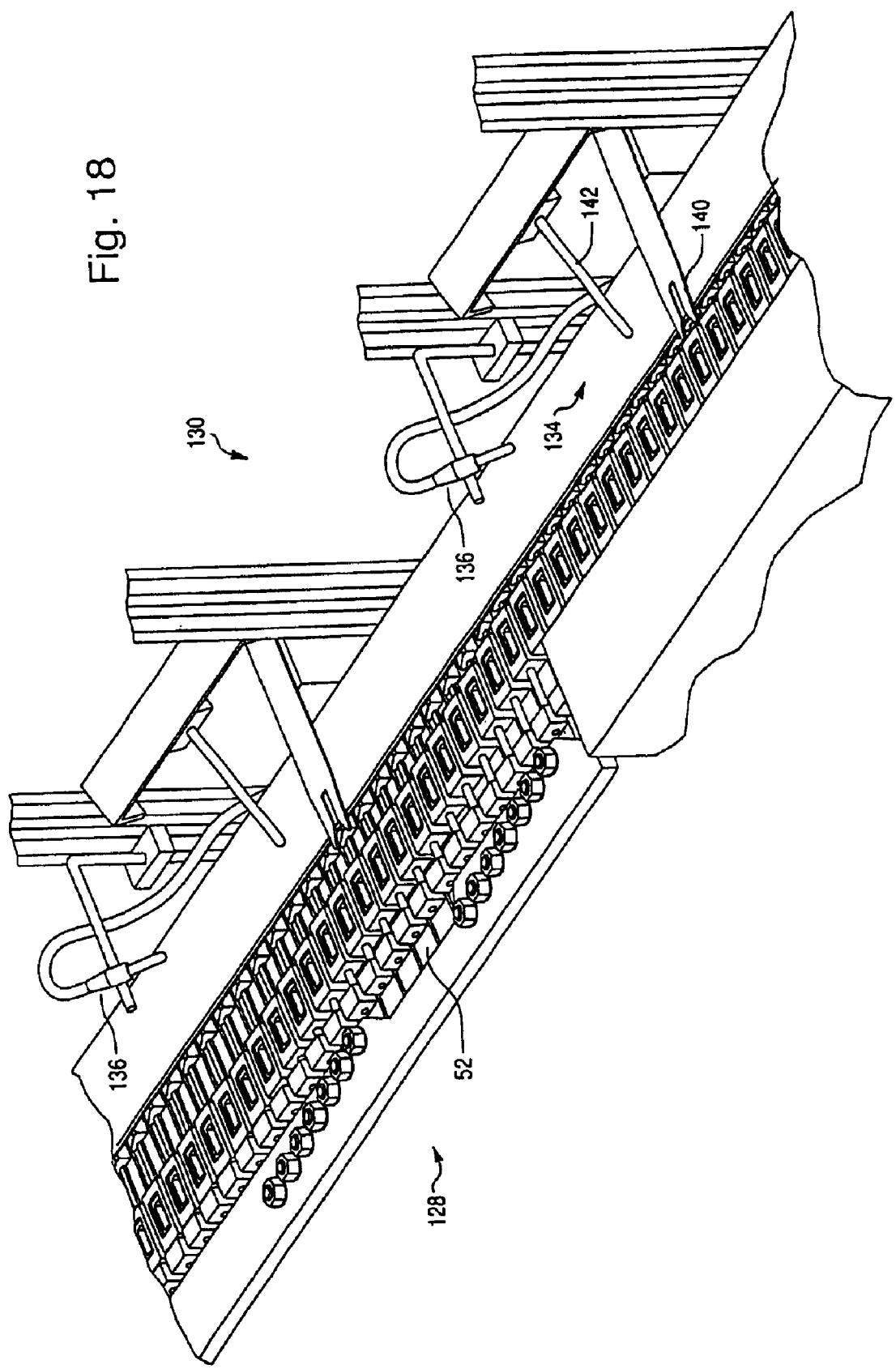
FIG. 18 is a perspective view of one embodiment of a parts removal system of the present invention.
Figure 19:
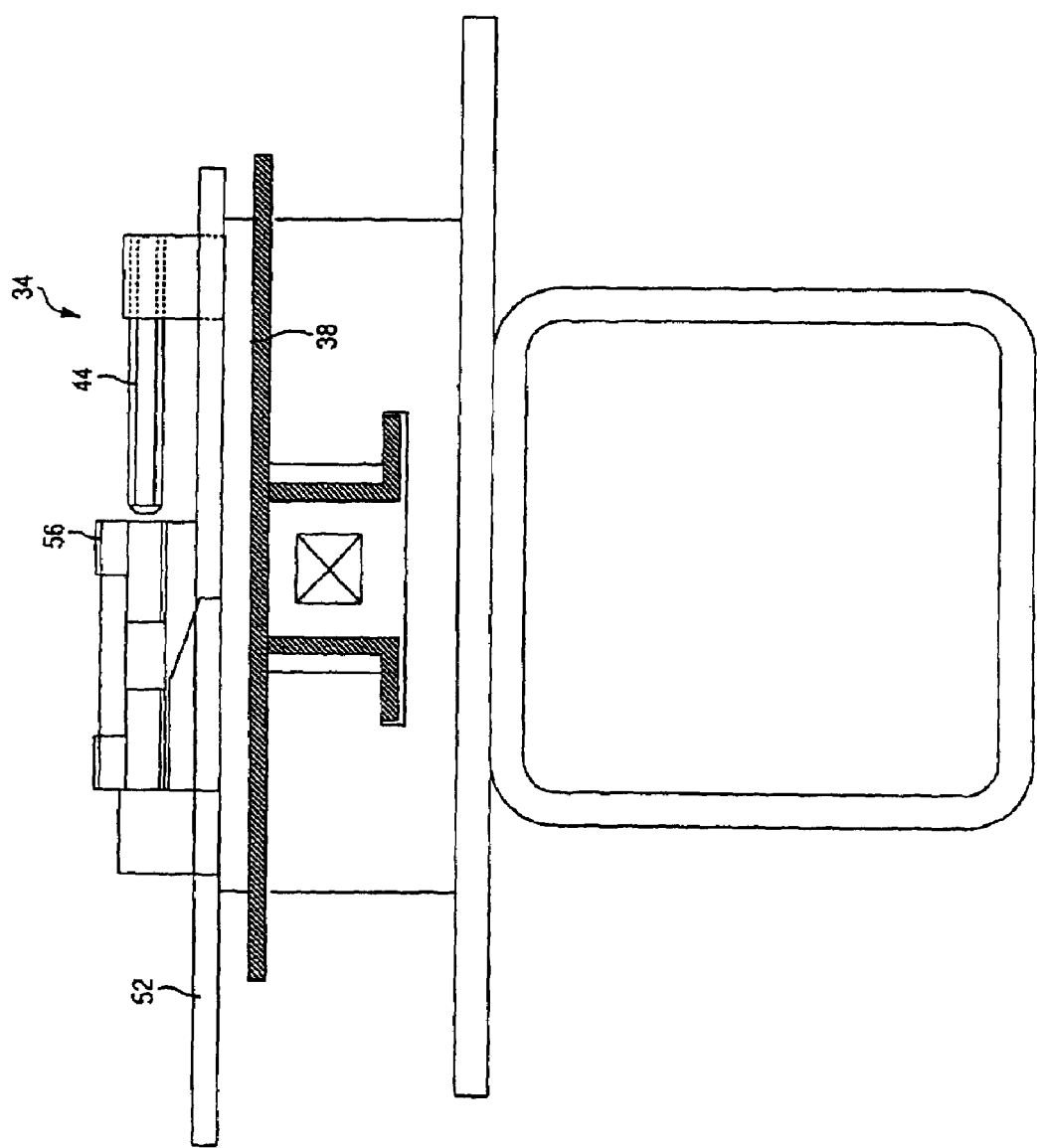
FIG. 19 is a partial cross-sectional view of a preferred embodiment of a parts nest of the present invention in an unload position, taken along section 19-19 of FIG. 1.

The nest 34 next proceeds through another set of cam followers 128 as illustrated in FIGS. 1 and 18. The followers 128 contact the angled end 63 of the slide 52 and move the slide along the base 38 to a position where the pin 44 is completely removed from the central chamber 59 of the mold cavity 58 and the passageway 60 of the parts holder 56. As the slide 52 moves along the base 38 the angled surface 50 of the parts remover 49 contacts the bottom of the lower clip 16, moving the clip 12 vertically out of the passageway 60 to a position so that it rests of the parts remover 49 and is loose in the chamber 59. In this position, the sealing element 28 no longer rests on the mold cavity 58 and the bottoms 19 and 21 of the retaining elements are no longer in the guides 64 and 65 as illustrated in FIG. 19. In this position, the clip can easily be removed from the nest 34.

The nest 34 then moves through a bad part eject station 130. At this station, a sensor 132 such as a model BOS 26K-PA-1LH8-54-C manufactured by Balluff is utilized to sense whether a retaining element is present on each clip 12. If a retaining element is not present the sensor 132 sends a signal to the station 130 to remove that clip from its nest thereby prohibiting that clip from traveling further along the conveyor 32, on that basis alone, a nest identifying information with respect to that particular nest is checked from the controller 88, otherwise to determine whether a clip should be removed at this point for any other reason. This station primarily works when the system is not up to operating temperature. The station 10 is disabled when the machine controller senses that all operating parameters are functioning within the pre-specified limits of the system. The bad part eject station also works in conjunction with the cycle, start and stop and automatic stop functions of the system.

If the clip 12 in an identified nest 34 is not determined to be bad and is not removed at the bad part eject station 130, then the clip continues to the parts removal station 134. A sensor 136, such as an optical sensor or proximity switch as described in connection with the eject station 130 senses when a nest 34 with a clip 12 therein lines up with the ejector 138, as particularly illustrated in FIGS. 18, 20 and 21. The same ejector is used at the bad part eject station 130. The ejector 138 slides a fork 140 along the upper portion 15 of the clip 12 above the sealing element 28 and traps the clip between the tines of the fork. The fork 140 then lifts the clip 12 out of the nest 34 and into close proximity with an air gun 142. The air gun 142 then emits a pressurized shot of air to slide the clip 12 off of the fork 140 and into a container 144 for collection. The fork 142 then retracts to its original rest position and waits for the next nest 34 with a part in it. The ejector 138 will not cycle unless the sensor 136 indicates that there is a part in the nest 34.

The empty nests 34 then continue to move along the conveyor 32 where they next encounter a final set of cam rollers 146. These cam rollers 146 contact and move the slide 52 in a previously described fashion back to the load position illustrated in FIG. 4. In this manner, the system forms a sealing device on a clip in less than one entire lap of its racetrack configuration and further permits continuous processing of parts without shutting the conveyor down. The nests 34 then travel on to the auto load station 36 and the process described starts over again.

In certain preferred embodiments the controller 88 may be combined with a modem or other similar device. Such devices permit data from the controller to be monitored from a remote location on a real time basis over the Internet or phone lines.

Such a system can also be used to operate or change certain parameters governed by the controller from a remote location.

While the principles of the invention have been made clear in illustrative embodiments, it will be obvious to those skilled in the art that many modifications of structure, arrangement, proportions, the elements, materials and components can be used in the practice of the invention, which are particularly adapted to specific environments and operative requirements without departing from those principles. The appended claims are intended to cover and embrace any and all such modifications, within the spirit and scope of the invention.

What is claimed is:

1. A method of forming a sealing element on a fastening device, said method comprising the steps of:
    conveying at least one fastening device nest, the fastening device nest having a chamber, a lock, and a release that are moveable relative to each other from a first position wherein the chamber is open to a second position wherein a portion of the lock is located within the chamber to a third position, wherein a portion of the release is in the chamber;
    introducing a fastening device into the chamber of the fastening device nest while the fastening device nest is in the first position;
    applying material to a predetermined portion of the fastening device contained in the fastening device nest;
    heating the fastening device nest to a temperature sufficient to cure the material applied to the fastening device in the fastening device nest; and
    removing the fastening device from the fastening device nest.

2. A method as set forth in claim 1 including the step of moving the chamber, the lock, and the release relative to each other from the first position to the second position prior to said step of applying.

3. A method as set forth in claim 2 including the step of moving the chamber, the lock, and the release relative to each other from a second position to a third position after said step of applying.

4. A method as set forth in claim 1 including the step of urging the fastening device into proper alignment and seating in the fastening device nest.

5. A method as set forth in claim 4 including the step of urging the fastening device into proper alignment and seating in the fastening device nest prior to said step of moving the chamber, the lock, and the release relative to each other from the first position to the second position.

6. A method as set forth in claim 1 wherein said step of urging includes causing said step of applying to occur only when the fastening device has been determined to be present in the fastening device nest.

7. A method as set forth in claim 1 wherein the release urges the fastening device out of the chamber when the release is in the third position.

8. A method of forming sealing elements on fastening devices, said method comprising the steps of:
    conveying a plurality of fastening device nests, each of the fastening device nests having a chamber, a lock, and a release that are moveable relative to each other from a first position wherein the chamber is open to a second position wherein a portion of the lock is located within the chamber to a third position, wherein a portion of the release is in the chamber;
    introducing fastening devices into the chambers of the fastening device nests while the fastening device nests are in the first position;
    applying material to a predetermined portion of each fastening device contained in one of the fastening device nests;
    heating the fastening device nests to a temperature sufficient to cure the material applied to the fastening devices in the fastening device nests; and
    removing the fastening devices from the fastening device nests.

9. A method as set forth in claim 8 including the step of urging the fastening devices into proper alignment and seating in the fastening device nests.

10. A method as set forth in claim 8 wherein said step of heating occurs prior to said step of applying.

11. A method as set forth in claim 8 wherein said step of heating occurs after said step of applying.

12. A method as set forth in claim 8 wherein said heating step occurs both prior to and after said heating step.

13. A method as set forth in claim 9 wherein said step of urging includes identifying each one of the fastening device nests and determining whether one of the fastening devices is present in each identified fastening device nest.

14. A method as set forth in claim 9 wherein said step of urging includes causing said step of applying to occur only when one of the fastening devices has been determined to be present in one of the fastening device nests.

15. A method as set forth in claim 8 including the steps of determining whether one of the fastening devices contained in one of the fastening device nests should be rejected and removing all rejected fastening devices in said step of determining from their respective fastening device nests while allowing all non-rejected fastening devices to continue to be conveyed on the fastening device nests.

16. A method as set forth in claim 8 including the step of removing the non-rejected fastening devices from the fastening device nests.

17. A method as set forth in claim 8 wherein said step of removing includes lifting the fastening devices from the fastening device nests and thereafter directing an airstream toward the fastening devices.

18. A method as set forth in claim 8 wherein said step of conveying includes conveying the fastening devices along an endless conveyor having a closed racetrack configuration and accomplishing all of the steps in less than one complete revolution of the conveyor.

* * * * *